United States Patent
Kimes et al.

(10) Patent No.: US 7,451,862 B2
(45) Date of Patent: *Nov. 18, 2008

(54) RATCHETING ONE-WAY CLUTCH HAVING ROCKERS RETAINED IN CLOSED POCKETS

(75) Inventors: John W. Kimes, Wayne, MI (US);
Bernard J. Simon, Troy, MI (US);
Norman J. Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/237,029

(22) Filed: Sep. 28, 2005

(65) Prior Publication Data

US 2006/0021839 A1    Feb. 2, 2006

Related U.S. Application Data

(63) Continuation-in-part of application No. 10/899,918, filed on Jul. 28, 2004, now Pat. No. 7,100,756.

(51) Int. Cl.
*F16D 41/12*    (2006.01)

(52) U.S. Cl. ............................ 192/46; 192/71

(58) Field of Classification Search ............ 192/46
See application file for complete search history.

(56) References Cited

U.S. PATENT DOCUMENTS

| | | | | |
|---|---|---|---|---|
| 285,943 | A | * | 10/1883 | Ames ..................... 74/136 |
| 709,900 | A | | 9/1902 | Gurney et al. |
| 1,832,805 | A | * | 11/1931 | Brewster ................. 192/46 |
| 1,883,966 | A | | 10/1932 | Krause |
| 2,013,765 | A | | 9/1935 | Richardson |
| 2,134,405 | A | | 10/1938 | Hulshizer |
| 2,323,353 | A | | 7/1943 | Plog |
| 2,710,504 | A | | 6/1955 | Dodge |
| 2,818,950 | A | | 1/1958 | Harless |
| 3,197,001 | A | | 7/1965 | Clements |
| 3,527,327 | A | | 9/1970 | McCreary |
| 3,563,354 | A | | 2/1971 | Sigg |
| 3,997,041 | A | | 12/1976 | Judd |
| 4,363,390 | A | | 12/1982 | Eisend et al. |
| 4,788,874 | A | | 12/1988 | Nelson et al. |
| 5,064,037 | A | | 11/1991 | Long, Jr. |
| 5,070,978 | A | | 12/1991 | Pires |

(Continued)

FOREIGN PATENT DOCUMENTS

EP    1388683    2/2004

(Continued)

*Primary Examiner*—Richard M. Lorence
(74) *Attorney, Agent, or Firm*—David B. Kelley; MacMillan, Sobanski & Todd, LLC

(57) ABSTRACT

An overrunning one-way clutch includes a cam plate formed with cam surfaces angularly spaced about a central axis, and a rocker plate including pockets angularly spaced about the axis, each pocket including a surface that closes the pocket at an axial end, an opening located at an axial end opposite the surface, and an aperture facing the cam surfaces. Each pocket contains a rocker supported for pivoting a portion of the rocker through the pocket aperture toward the cam surfaces. Springs supported on the rocker plate, urging each rocker toward an aperture and engagement with the cam surfaces.

21 Claims, 21 Drawing Sheets

U.S. PATENT DOCUMENTS

| | | | |
|---|---|---|---|
| 5,143,189 A | 9/1992 | Meier-Burkamp | |
| 5,853,073 A | 12/1998 | Costin | |
| 5,947,245 A | 9/1999 | Costin et al. | |
| 5,954,174 A | 9/1999 | Costin | |
| 5,971,122 A | 10/1999 | Costin et al. | |
| 6,062,362 A | 5/2000 | Costin et al. | |
| 6,109,410 A | 8/2000 | Costin | |
| 6,189,666 B1 * | 2/2001 | Willmot | 192/46 |
| 6,373,157 B1 | 4/2002 | Sekine | |
| 6,575,275 B2 | 6/2003 | Muramatsu et al. | |
| 6,679,364 B2 | 1/2004 | Muramatsu et al. | |
| 2001/0025758 A1 | 10/2001 | Kinoshita | |
| 2002/0056602 A1 | 5/2002 | Aurora | |
| 2002/0112933 A1 | 8/2002 | Yamamoto et al. | |
| 2002/0148697 A1 | 10/2002 | Muramatsu et al. | |
| 2003/0146063 A1 | 8/2003 | Yamada et al. | |
| 2006/0021836 A1 * | 2/2006 | Kimes et al. | 192/46 |
| 2006/0021837 A1 | 2/2006 | Kimes et al. | |
| 2006/0021838 A1 * | 2/2006 | Kimes et al. | 192/46 |

FOREIGN PATENT DOCUMENTS

| | | |
|---|---|---|
| FR | 548490 | 1/1923 |
| GB | 2116 | 1/1907 |

* cited by examiner

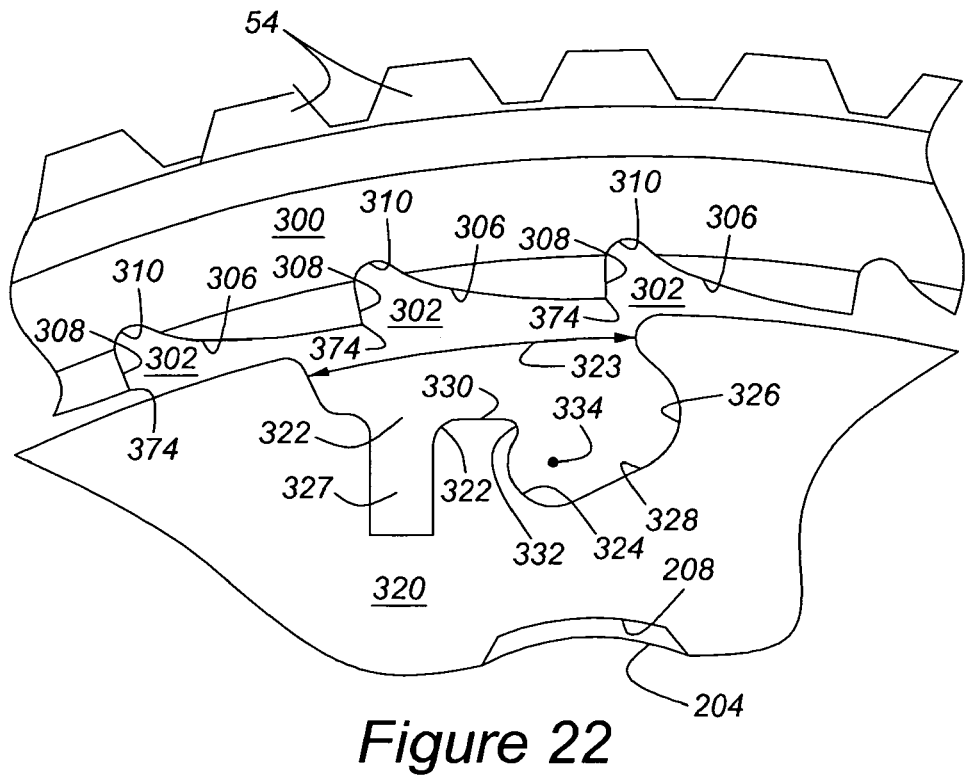
Figure 22
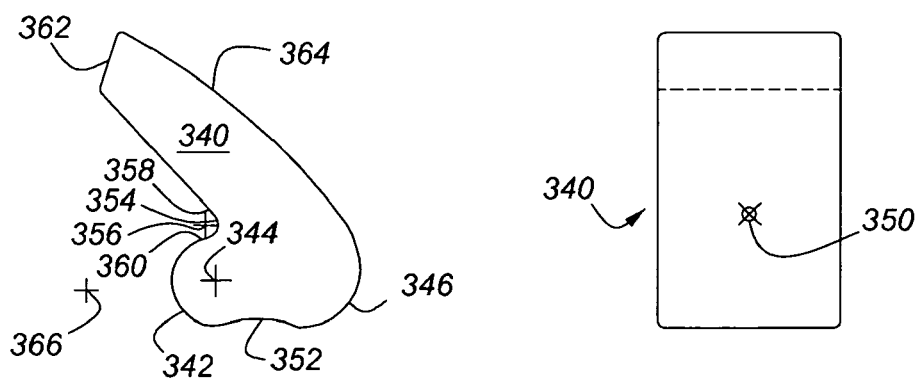
Figure 23
Figure 24

RATCHETING ONE-WAY CLUTCH HAVING ROCKERS RETAINED IN CLOSED POCKETS

CROSS REFERENCE TO RELATED APPLICATION

This application is a continuation-in-part of U.S. application Ser. No. 10/899,918, filed Jul. 28, 2004 now U.S. Pat. No. 7,100,756.

BACKGROUND OF THE INVENTION

1. Field of the Invention

The invention relates in general to a clutch that produces a drive connection between components when their relative rotation is in one direction, and overruns when relative rotation is in the opposite direction. In particular, the invention pertains to such clutches having rockers that engage or disengage at least partially due to the effect of centrifugal force acting on the rocker.

2. Description of the Prior Art

Conventional one-way clutches for producing a one-way drive connection between inner and outer races of the clutch include sprags or rollers for releasably driveably connecting the races and the components of a mechanical assembly connected to the races. Such clutches are commonly used in the powertrain or driveline of an automotive vehicle. One-way clutches perform satisfactorily in many cases, but certain applications, such as those in which large magnitudes of torque are transmitted by the clutch, or those that provide only a small space for the clutch, require one-way clutches other than conventional sprag-type or roller-type clutch to meet desire requirements.

Conventional one-way clutch assemblies have at least one sprag or roller, which driveably locks two notched or pocketed races together mutually in one rotary direction and allows the races to rotate freely in the other direction. Rocker and sprag type one-way clutch assemblies can increase the torque capacity for a given package size compared to those of a roller-type clutch, but they are generally limited in torque transmitting capacity by the magnitude of the contact or bearing stresses caused by contact of the rockers or sprags with the races.

To overcome these and other difficulties, a one-way overrunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an importance factor in the design.

U.S. Pat. No. 5,954,174 discloses a ratchet one-way clutch assembly having an inner race with notches, an outer race with pockets, and rockers located in the pockets to engage the notches. The rockers have a pivot ridge which mates with a peak or recess in the pockets in the outer race to position the rocker in the pocket. The center of mass of each rocker is located such that the rocker tends to engage or disengage a notch in the inner race. A spring is used to provide a tilting force on each rocker directed to produce engagement of the rocker with a notch.

Conventional one-way clutches develop relatively large magnitudes of hoop stress in the races when torque is transmitted through the clutch; therefore, the races of conventional one-way clutches are formed of bearing grade steel in order to withstand the operating hoop stress. Because the clutches disclosed in the '978 and '174 patents develop relative low operating hoop stresses in service, those clutch can be formed of powdered metal. Clutches formed for powdered metal potentially can be produced at relative low cost compared to the cost to form and produce a conventional clutch of high grade steel, provided extensive machining is avoided.

The clutches described in the '978 or '174 patents, however, require a significant amount of machining of the components that are formed of powdered metal. Excessive internal backlash, which can produce noise at unacceptable levels, is a potentially problem under certain operating conditions with these clutches.

A need exits, therefore, for a low cost, reliable one-way clutch that produces low operating bearing stresses and is able to be formed readily from powdered metal. The clutch should occupy little space, minimize in-service noise, and require little or no machining. Preferably, the desired clutch should include features that facilitate its assembly in a drive system.

SUMMARY OF THE INVENTION

The present invention provides a one-way clutch having an inner race, outer race, and pivoting rockers that driveably connect the races in one rotary direction and overrun in the opposite direction. The clutch is preferably formed of powdered metal. The rockers are located in one of the races, such that the clutch can employ centrifugal force to assist in disengaging the rockers from a notch plate during an overrun condition by biasing the rockers to pivot away from the notch plate. Alternately, the clutch can employ centrifugal force to assist in engaging the rockers with a notch plate by urging the rockers to pivot toward notch plate.

The shape of a pocket plate, which contains the rockers, uniquely requires no secondary machining operations for any purpose, such as to eliminate densifiers and de-densifiers in the powdered metal components. The components of the clutch that are formed from powdered metal require no machining after they are formed.

One axial end of the pockets is blind or closed by a surface, and the axially opposite end is open. Each rocker is formed with a unique undercut, and each pocket is formed with a retention projection that extends into the undercut recess and prevents the rocker from being removed for its pocket by passing through an aperture. A retainer plate, secured to the rocker plate for rotation as a unit, closes the open axial end of the pockets and open axial end of spring recesses to prevent chafing and wear of the rockers and springs.

The rocker plate and cam plate have mutually engaged pilot surfaces, which guide their relative axial movement during assembly and provide mutual bearing support as they rotate.

The number of notches for a given diameter is greater than other one-way clutches, thereby significantly reducing backlash. The design lends itself to easy assembly due to its configuration. A pocket plate subassembly contains the rockers and a return spring for each rocker. Before its assembly in the clutch, the pocket plate subassembly restricts the ability of each rocker to pivot in the pocket, and the force of the respective return spring prevents the rocker from exiting the pocket laterally by forcing the rocker into contact with its pocket. This arrangement permits the subassembly to be handled and transported prior to its installation in the clutch with is the rockers and springs already installed in the pocket plate subassembly.

An overrunning one-way clutch, according to this invention, includes a cam plate formed with cam surfaces angularly spaced about a central axis, and a rocker plate including pockets angularly spaced about the axis, each pocket including a surface that closes the pocket at an axial end, an opening located at an axial end opposite the surface, and an aperture facing the cam surfaces. Each pocket contains a rocker supported for pivoting a portion of the rocker through the pocket aperture toward the cam surfaces. Springs supported on the rocker plate, urging each rocker toward an aperture and engagement with the cam surfaces.

Unique fluid passages, partially formed by arcuate spline surfaces, and channels are provided to carry lubricant to critical surfaces of the rockers and notches. Each pocket is closed at one axial end to provide structural continuity, stiffness and strength to carry forces resulting from engagement of the rockers with the notches when the clutch is engaged. A spline tooth crest is located near each pocket and indexed relative to the pocket to provide additional structural strength and stiffness to carry these engagement loads.

Various objects and advantages of this invention will become apparent to those skilled in the art from the following detailed description of the preferred embodiment, when read in light of the accompanying drawings.

BRIEF DESCRIPTION OF THE DRAWINGS

FIG. 22 is a partial end view of the one-way clutch showing the pocket plate installed in the cam plate;

FIG. 23 is a front view of a rocker;

FIG. 24 is a side view of the rocker of FIG. 23;

DETAILED DESCRIPTION OF THE PREFERRED EMBODIMENT

Figure 1:
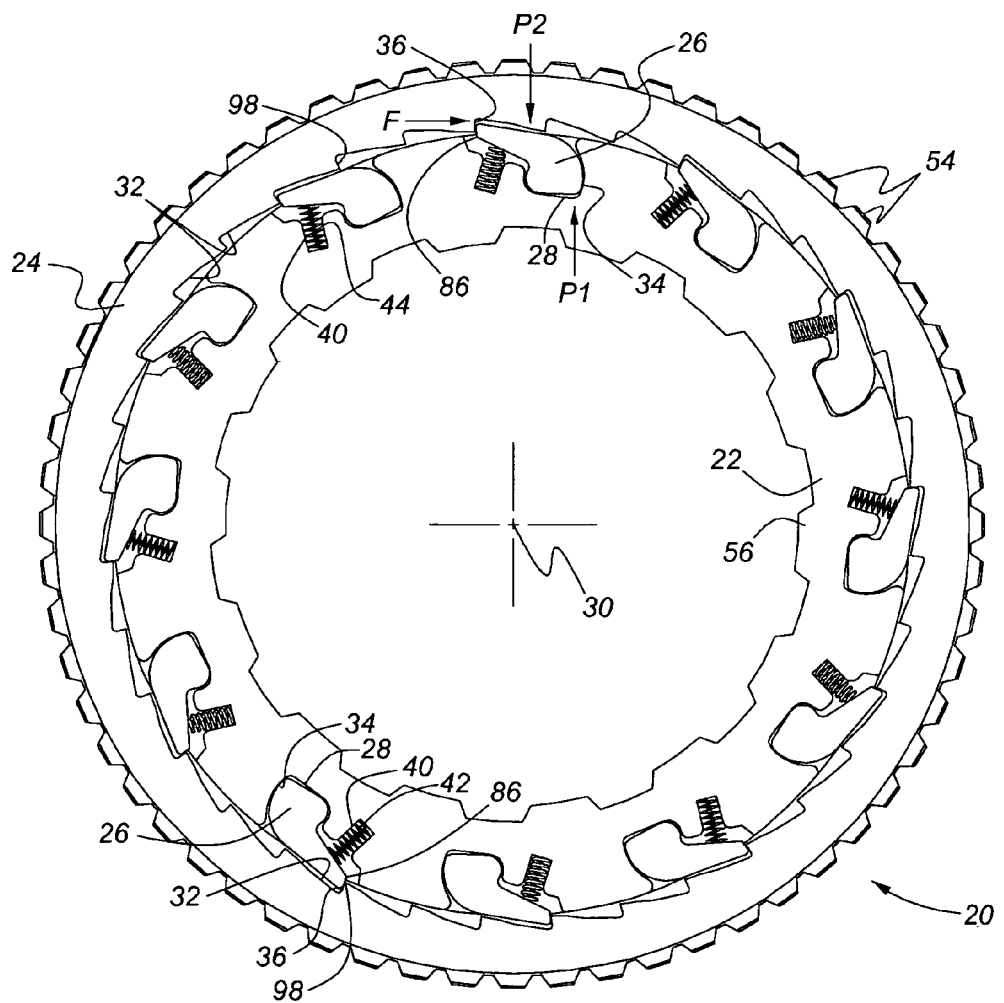
FIG. 1 is a side view of a clutch according to the present invention showing rockers located in an inner race and engaged with notches in an outer race.
Figure 2:
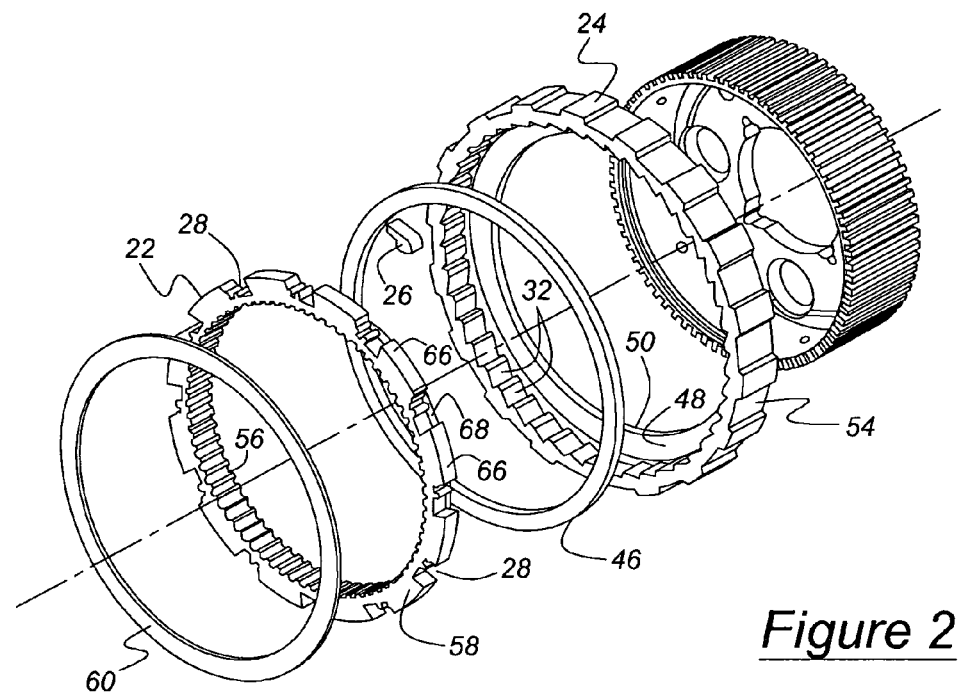
FIG. 2 is an isometric view of the clutch assembly showing the components mutually spaced axially.

Referring now to the drawings, there is illustrated in FIG. 1 a one-way clutch assembly 20 in accordance with the present invention. The clutch assembly 20 includes an inner race or rocker plate 22, an outer race or cam plate 24, and a plurality of rockers 26, each rocker being located in a pocket 28 formed in the inner race 22 and angularly spaced mutually about a central axis 30. The inner periphery of the outer race 24 is formed with a plurality of cams or notches 32 angularly spaced mutually about axis 30. There are twelve rockers 26 and pockets 28 and thirty-six notches 32 in the clutch illustrated in FIG. 1.

When the inner race 22 rotates clockwise faster than the outer race 24, each rocker 26 pivots counterclockwise in its pocket 28 away from engagement with the notches 32 due to contact of the rockers with the inner radial surface of the outer race. This allows the inner race 22 to rotate freely clockwise about axis 30 relative to the outer race 24. When the inner race 22 attempts to rotate counterclockwise relative to the outer race 24, the inner race and outer race are engaged or driveably connected mutually by engagement of the rockers 26 with the notches 32.

When the clutch 20 is engaged, each engaged rocker 26 transmits a force F between the inner and outer races 22, 24 due to its contact with the inner surface 34 of the pocket and with the radially directed surface 36 of the engaged notch 32.

A recess 40, located at each pocket 28, contains a spring, such as a helical coiled compression spring 42 or an accordion compression spring 44, for urging each rocker to pivot in its pocket toward engagement with the notches.

FIG. 2-5 show a clutch having a rocker plate 22 formed with angularly spaced pockets 28 and spring recesses 40, each pocket containing a rocker 26 that pivots in a respective pocket alternately to engage and to disengage the notches 32 formed on the radially inner surface of the cam plate 24. A bushing 46 of powdered metal fits within the cam plate 24.

Figure 5:
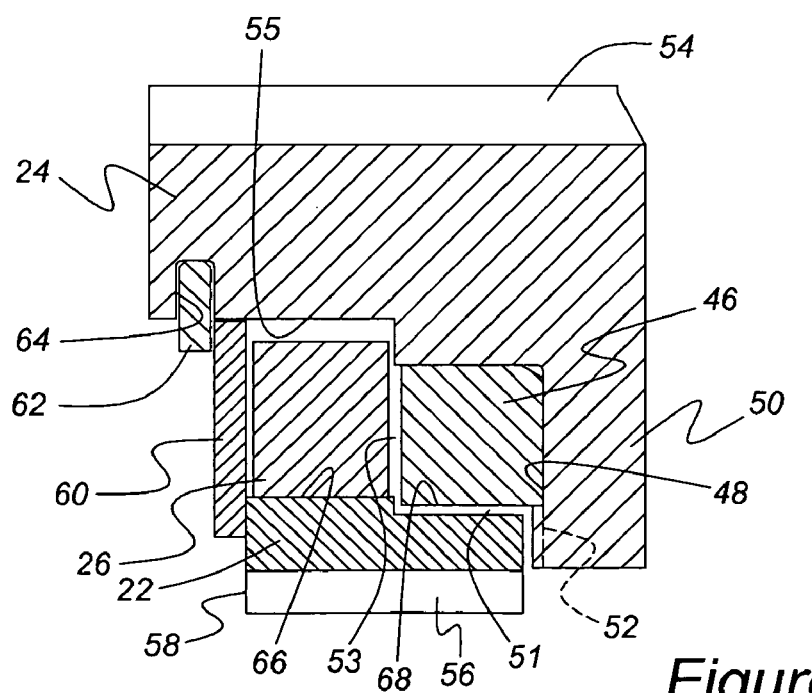
FIG. 5 is a side view, partial cross section through a diametrical plane showing the components assembled.

As seen best in FIG. 5, when clutch 20 is assembled, an axial surface of bushing 46 contacts an inner axial surface 48 of a flange 50. Surface 48 is formed with radially directed grooves 52, which carry fluid lubricant, preferably transmission oil, radially outward a radial inner surface of the bushing 46. Oil enters the radial grooves 52 through holes 49 formed through a drive system component 72, which is connected to the clutch 20. The oil travels axially leftward across the inner radial surface 51 on the bushing 46, to a radial space 53, which directs the oil radially outward to surface 55, across the width of the rocker plate 22 and across the surface of the rockers 26. Bushing 46 pilots the inner and outer races 22, 24 and eliminates need to machine along the notches or cams 32 of the outer race or the radial outer surface area 66 of the rocker plate 22. Lubricating oil is precisely directed radially along grooves 52 to the bushing 46, then axially between surfaces 68 on the rocker plate 22 and the inside diameter 51 of the bushing 46 to the rockers 26. The lubricant flows along this path due to a centrifugal pressure head developed as the clutch rotates about axis 30.

The radial outer surface of the cam plate 24 is formed with splines 54, by which the cam plate is driveably connected to a drive system. Similarly, the radially inner surface of the rocker plate 24 is formed with splines 56, by which the rocker plate is driveably connect to a component of the drive system.

An axial surface 58 of rocker plate 22 contacts a retainer ring 60, which closes the axial end of each pocket 28 and is retained in position by a snap ring 62, which engages a recess 64 formed on the cam plate 24.

Figure 3:
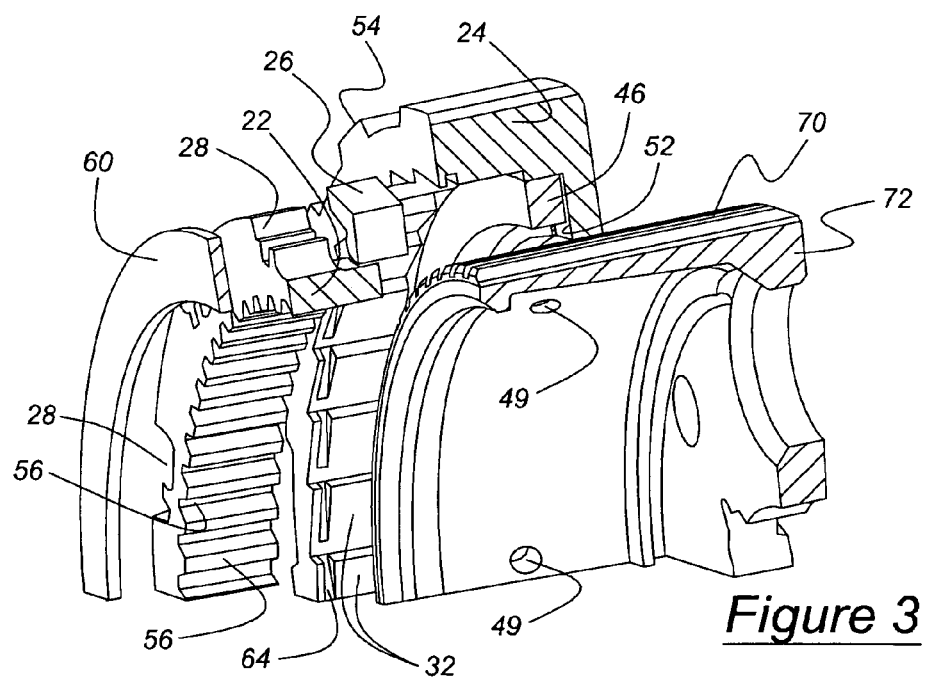
FIG. 3 is an isometric view of the clutch assembly of FIG. 2 partially in cross section taken at a diametric plane showing the components in spaced relationship.
Figure 4:
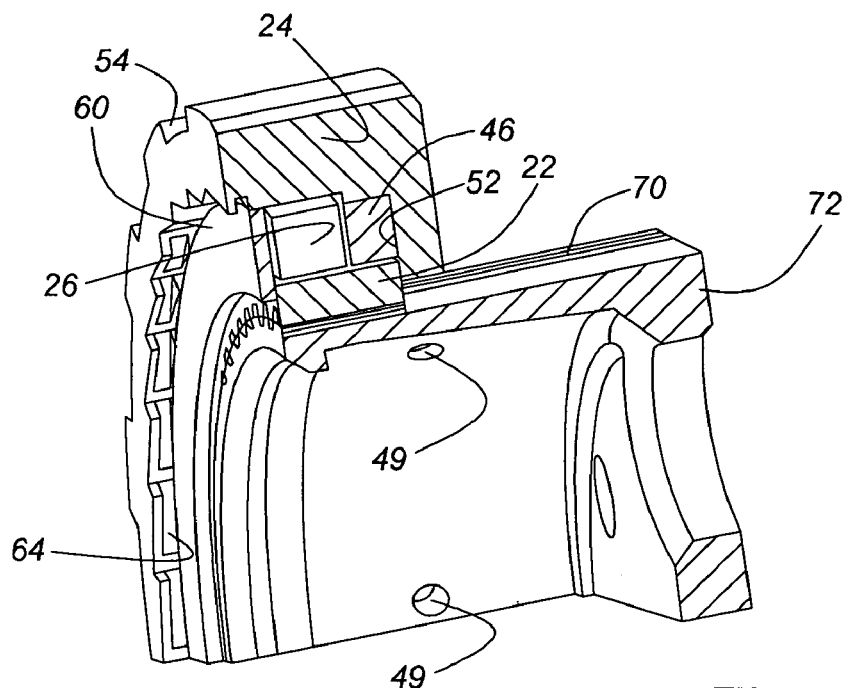
FIG. 4 is an isometric view of the clutch assembly of FIG. 2 partially in cross section through a diametrical plane showing the components assembled.

FIGS. 3 and 4 show the components of the clutch 20 located immediately adjacent their assembled positions and in the assembled positions, respectively. The clutch 20 is assembled with the cam plate 24 driveably connected by splines 70 to a drum 72 of a vehicle drive system.

Figure 6:
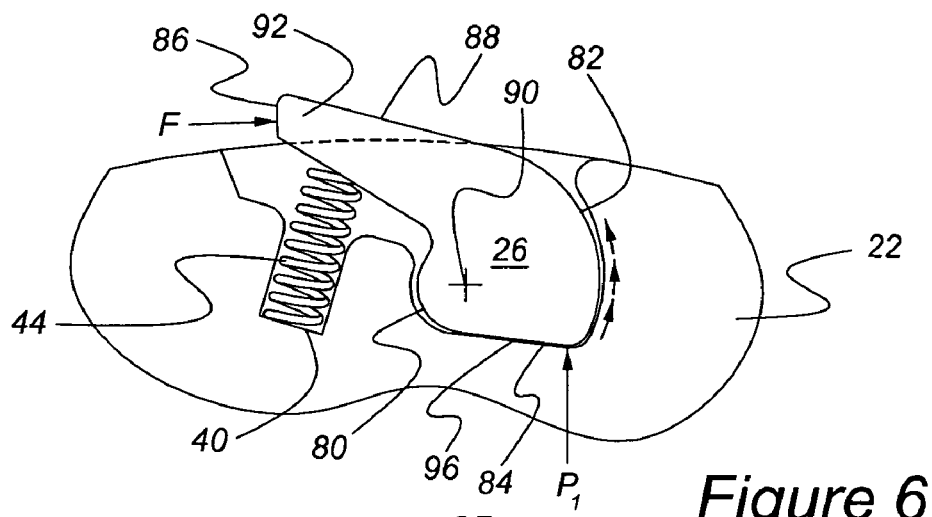
FIG. 6 is side view of a portion of an inner race showing a rocker, pocket, and return spring.

Referring now to FIG. 6, a preferred embodiment of a rocker 26 may include several surfaces 80, 82, 84, 86, 88, and a defined pivot center 90. Surfaces 80 and 82 are both circular cylindrical surfaces whose arcs are concentric with the pivot center 90. Surfaces 80, 82 guide rotation or pivoting of the rocker 26 and limit that pivoting to one degree of freedom. The arcs of both surfaces 80, 82 must be sufficient such that the neck or strut portion 92 of the rocker is narrower than the counterweight portion 94 in order to restrain the rocker in the radial direction from center 90.

Surface 80 is a guiding surface. When force F is applied while the clutch is driving and the rockers 26 are engaged with the notches 32, preferably no reaction force is developed on surface 80. Surface 82 is a surface on which the reaction to force F is developed when clutch 20 is transmitting torque between the outer race and inner race 22 through the rocker 26. Because the center of surface 82 is located at the pivot center 90, the reaction to force F is distributed along surface 82 is centered at pivot center 90, and produces no torque tending to pivot the rocker 26 about the pivot center.

Surface 84 limits clockwise pivoting of the rocker 26 and assists assembly of the race 22 or 24 that contains the pockets 28, rockers 26 and springs 42, 44. That race is prepared for installation by inserting a rocker 26 in each pocket and placing a spring 42, 44 in each recess 40. The force applied by the spring on its respective rocker rotates the rocker to the position shown in FIG. 6 where surface 84 contacts the base 96 of the pocket 28. The spring force and its reaction force on the base 96 retain the rocker in the pocket without the presence of the other race or another assembly aid. The race containing the rockers can be transported readily with the rockers in this retained condition preparatory to installing the race subassembly in the clutch assembly 20.

By limiting pivotal rotation of the rocker 26 about pivot center 90, a counter-rotation reaction force on the strut is generated at surface 84 when the clutch is driving or engaged. When clutch 20 is driving, force F, applied to rocker surface 86, produces a clockwise torque on the rocker about the pivot center 90. Torque about center 90 produced by force F is reacted by a force P1 where rocker surface 84 contacts pocket surface 96. Without surface 84, the full reaction torque would be reacted elsewhere. For example, if the full torsion reaction to force F were applied to rocker surface 88, a large hoop stress would be generated on the race contacted by surface 88 tending to shear the wall of that race due to a high angle of incidence of the reaction force. If the torsion reaction to force F were applied to surface 82, it would be applied at the extremity of the inner race at its weakest point. Preferably, the torsion reaction to force F is located normal to the pocket base 96 at rocker surface 84, and on surface 82 where friction is developed due to contact with the pocket.

Surface 86 is the surface on which force F is applied when the clutch 20 is driving and the rockers 26 are engaged with the radial surfaces 36 of the notches 32. Surface 86 performs this function by creating a mechanical interference when the rocker is pivoted to the engaged position.

Surface 88, located at the contour of the strut portion 92 of the rocker 26, contacts the crest 98 of the radial surfaces 36 of the notches 32 to ensure no interference when the clutch 20 is overrunning and the rockers 26 are disengaged from the notches 32. Surface 88 is curved to facilitate formation of a film of lubricant while the clutch is overrunning. Surface 88 is curved also to minimize impact with the crests 98 while the clutch overruns by providing transitional positions that minimize the rate of rotation of the rocker into the pocket relative to the rate of rotation of the outer race. This minimizes angular acceleration on the rocker as the clutch overruns.

The center of mass 100 of the rocker 26 can be located in relation to the pivot center 90 such that centrifugal force tends either to engage or to disengage the rocker, whether the rocker is located on the outer race or the inner race.

Figure 7:
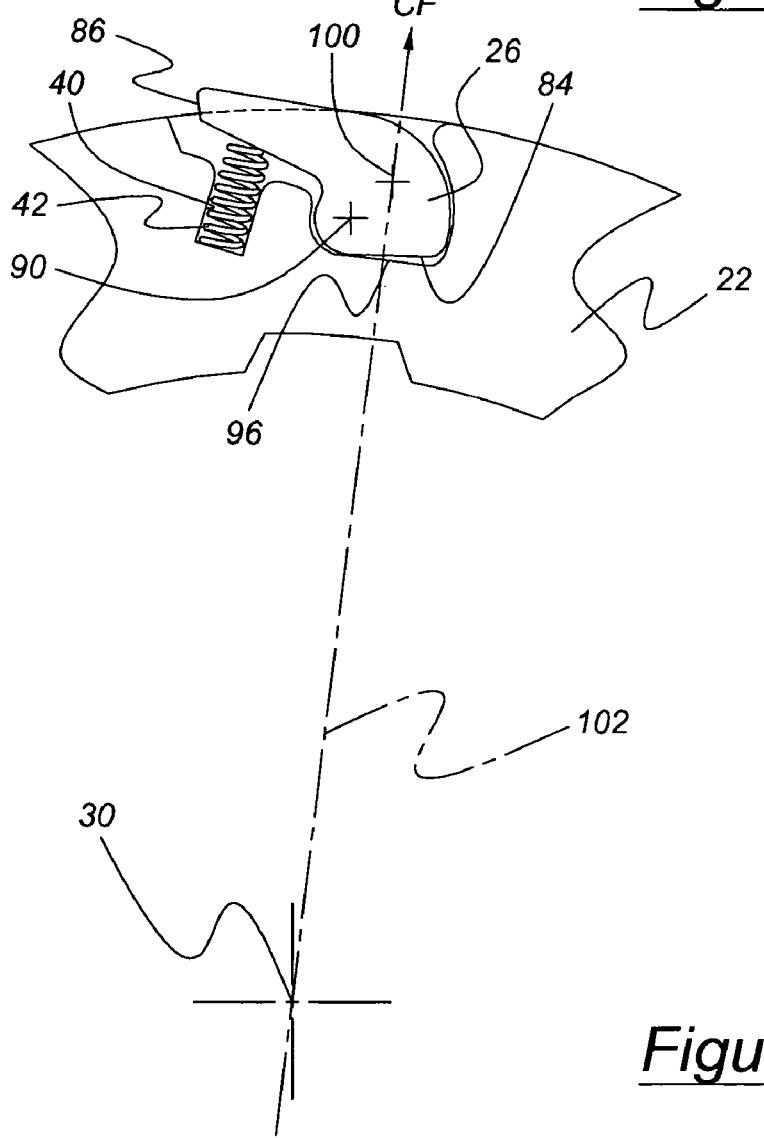
FIG. 7 is side view of a portion of an inner race showing a rocker, pocket, return spring, and a CF vector.

When viewed as in FIG. 7, the center of mass 100 is located rightward from a line connecting the axis 30 and the pivot center 90, and the rocker is carried in a pocket located on an inner race 22. As the clutch assembly 20 rotates about axis 30, centrifugal force on the rocker is directed radially outward along a line 102 that passes through axis 30 and the center of mass 100, causing the rocker 26 to pivot counterclockwise about the pivot center 90. This counterclockwise pivoting of the rocker opposes the force of the spring 42, 44 and tends to pivot rocker surface 86 away from contact with pocket surface 36 on the inner race 24. This counterclockwise pivoting of the rocker tends to move the rocker to a disengaged position, and allows the inner race 22 to overrun and the clutch 20 to disengage. The magnitude of the moment about pivot center 100 tending to compress spring 42 and to pivot the rocker 26 to the disengaged position varies with the speed of rotation of the inner race and the distance of the center of mass 100 from the pivot center 90.

Alternatively the center of mass may be located leftward from a line connecting the axis 30 and the pivot center 90, when the rocker is carried in a pocket located on an inner race 22. In that case, as the clutch assembly 20 rotates about axis 30, centrifugal force on the rocker causes the rocker 26 to pivot clockwise about the pivot center 90. This clockwise pivoting of the rocker adds to the effect of the force of spring 42, tends to move surface 86 of the rocker toward contact with radial surface 36 on the outer race 24, i.e., to pivot the rocker 26 to an engaged position, and causes the clutch to engage.

Figure 8:
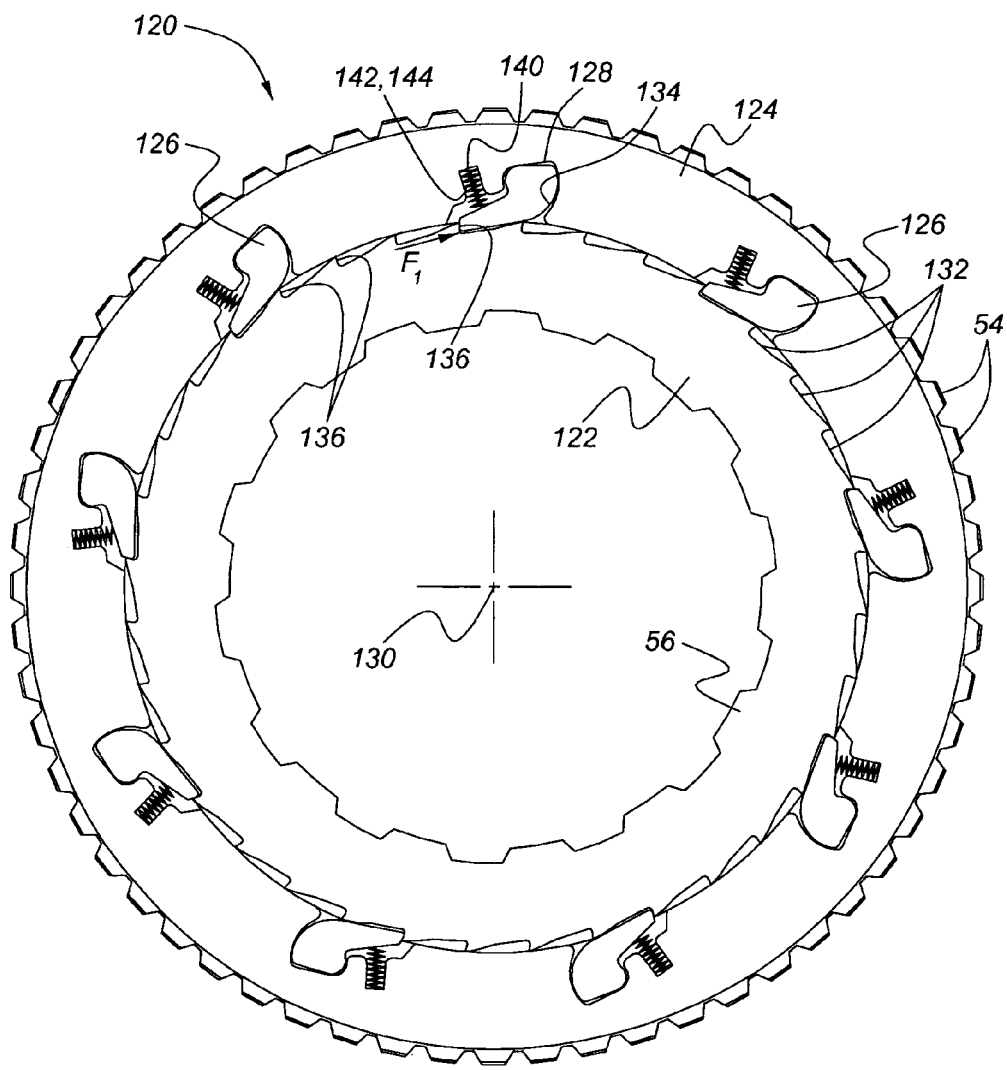
FIG. 8 is a side view of a clutch showing rockers located in an outer race and engaged with notches in an inner race.

FIG. 8 illustrates an embodiment of a clutch assembly 120, in accordance with the present invention. The clutch assembly 120 includes an inner race or rocker plate 122, an outer race or cam plate 124, and a plurality of rockers 126, each rocker being located in a pocket 128 formed in the outer race 124 and angularly spaced mutually about a central axis 130. The outer periphery of the inner race 122 is formed with a plurality of cams or notches 132, angularly spaced mutually about axis 30. There are nine rockers 126 and pockets 128 and thirty-six notches 132 in the clutch illustrated in FIG. 1.

When the outer race 124 rotates clockwise faster than the inner race 122, each rocker 126 pivots clockwise in its pocket 128 away from engagement with the notches 132 due to contact of the rockers with the outer radial surface of the inner race. This allows the outer race 124 freely to rotate clockwise about axis 130 relative to the inner race 122. When the outer race 124 attempts to rotate counterclockwise relative to the inner race 122, the inner race and outer race are engaged or driveably connected mutually by engagement of the rockers 126 with the notches 132.

When the clutch 120 is engaged, one or more engaged rockers 126 transmit a force between the inner race 122 and outer race 124 due to the rocker's contact with the inner surface 134 of the pocket 126 and with the radially directed surface 136 of the engaged notch 132.

A recess 140, located at each pocket 28, contains a spring, such as a helical coiled compression spring 142 or an accordion compression spring 144, for urging each rocker to pivot in its pocket toward engagement with the notches.

Figure 9:
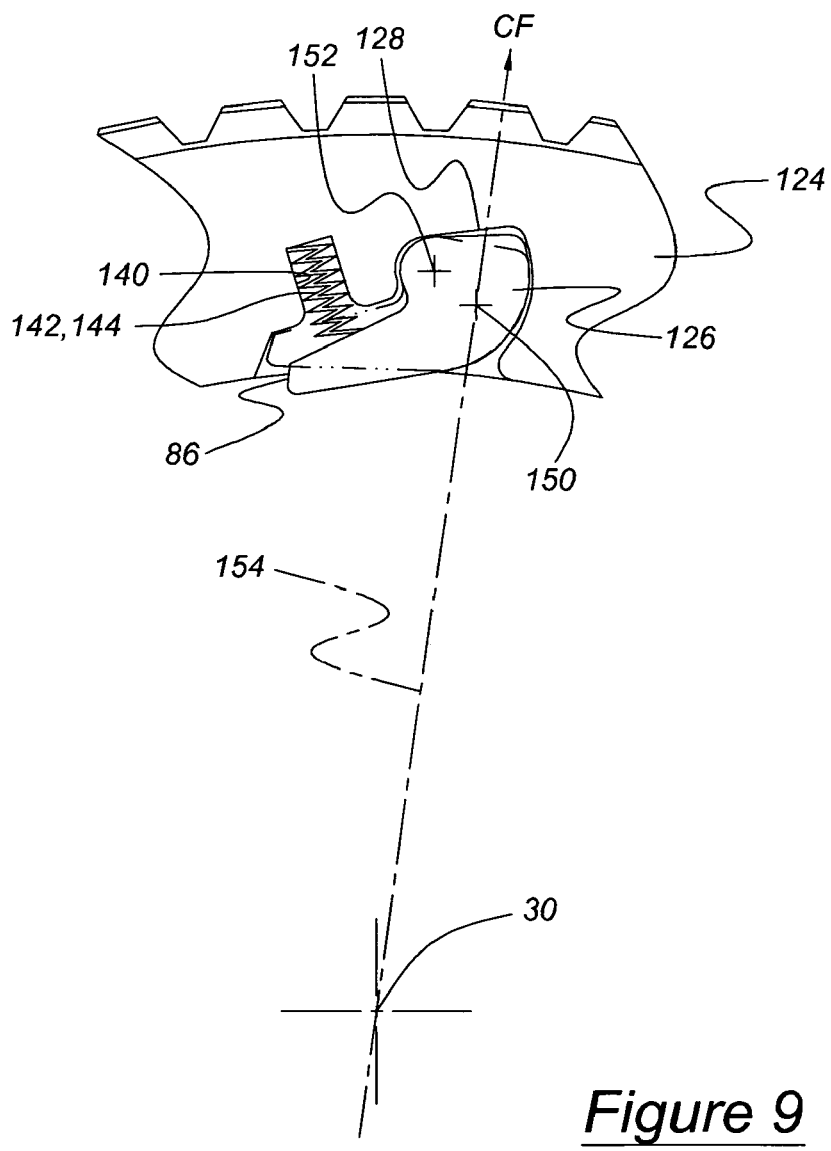
FIG. 9 is side view of a portion of an outer race showing a rocker, pocket, return spring, and a CF vector.
Figure 10:
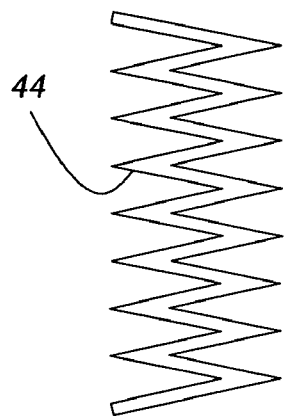
FIG. 10 is side view of an accordion return spring.
Figure 11:
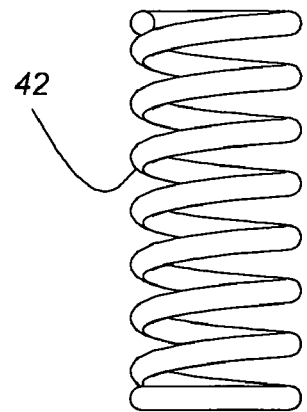
FIG. 11 is side view of a helical return spring.

When the clutch assembly 120 is viewed as in FIG. 9, the center of mass 150 of each rocker 126 is located rightward from a line connecting the axis 130 and the pivot center 152. As the outer race 124 rotates about axis 130, centrifugal force on the rocker is directed radially outward along a line 154 that passes through axis 130 and the center of mass 150, causing the rocker 126 to pivot counterclockwise about the pivot center 152. This counterclockwise pivoting of the rocker cooperates with the force of the spring 42, 44, tends to pivot the rocker to an engaged position with surface 136, and engages the clutch.

Alternatively, in the clutch assembly 120, the center of mass 150 of each rocker 126 may be located leftward from a line connecting the axis 130 and the pivot center 152. In that case, as the outer race 124 rotates about axis 30, centrifugal force on the rocker causes the rocker 126 to pivot clockwise about the pivot center 152. This clockwise pivoting of the rockers opposes the effect of the spring force and tends to pivot rotate surface 86 of the rocker away from contact with radial surface 136 on the inner race 122. This action tends to move the rocker to a disengaged position, and allows the clutch to overrun and to disengage.

Figure 12:
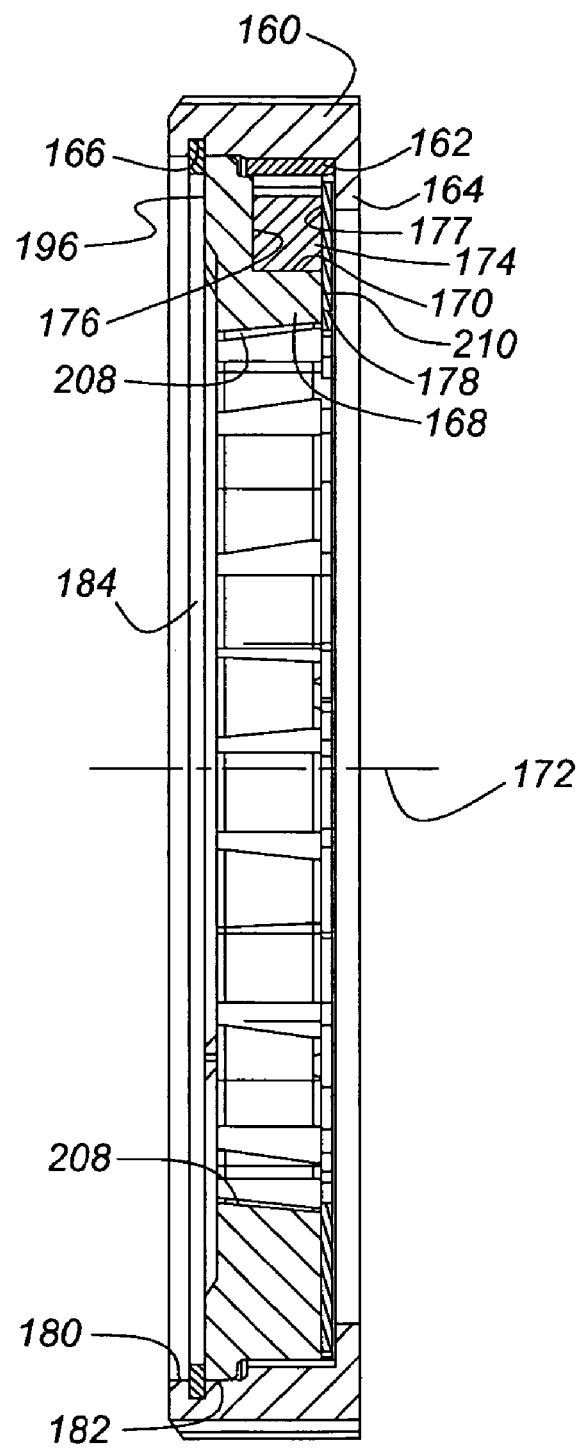
FIG. 12 is a cross section taken at a diametric plane through a one-way clutch assembly according to this invention.

Referring now to FIG. 12, an alternate clutch assembly, similar to that of FIGS. 1 and 8, includes a cam plate 160 formed with cam surfaces or notches 162, a radial flange 164 located at an axial end of the cam plate, a cylindrical interior journal surface 180, and a recess 166 formed in the journal surface 180 and located axially opposite flange 164.

A rocker plate 168 is formed with multiple pockets 170, angularly spaced at equal intervals about a central longitudinal axis 172, each pocket containing a rocker 174. Each pocket 170 is blind, i.e., closed at one axial end by the surface 176 of a bulkhead. Each pocket has an axial open end located at the opposite axial end from surface 176. The bulkhead has an exterior surface 196 that faces axially outward from surface 176. Each pocket 170 has an aperture located at its radial periphery and facing the cam surfaces 162, as FIGS. 1 and 8 illustrate for clutches 20 and 120. A portion of each rocker 174 pivots into the aperture of the respective pocket as the rocker pivots to toward the cam surfaces on cam plate 160. When the clutch overruns, each rockers ratchets on the cam surfaces as they contact and rotate past the rockers. The open end 177 of each pocket 170 and an axial end of each spring recesses 40 are covered by a retainer plate 178. Wear resulting from contact of the rocker and spring on a surface adjacent the end 177 is prevented by the retainer plate 178.

In the embodiment of FIG. 12, the cam plate 160 is formed with an internal, axially directed cylindrical journal surface 180, and the rocker plate 168 is formed with an external, axially directed cylindrical journal surface 182. The cam plate and rocker plate are piloted on the journal surfaces 180, 182 for axial movement to the assembled position shown in FIG. 12. Upon installation, surfaces 180, 182 are mutually engaged and provide bearing support for relative rotation of the cam plate and rocker plate. A retainer ring 184 seats in the recess 166 to secure the rocker plate 168 against axial movement relative to the cam plate 160 after their assembly and during operation.

Figure 13:
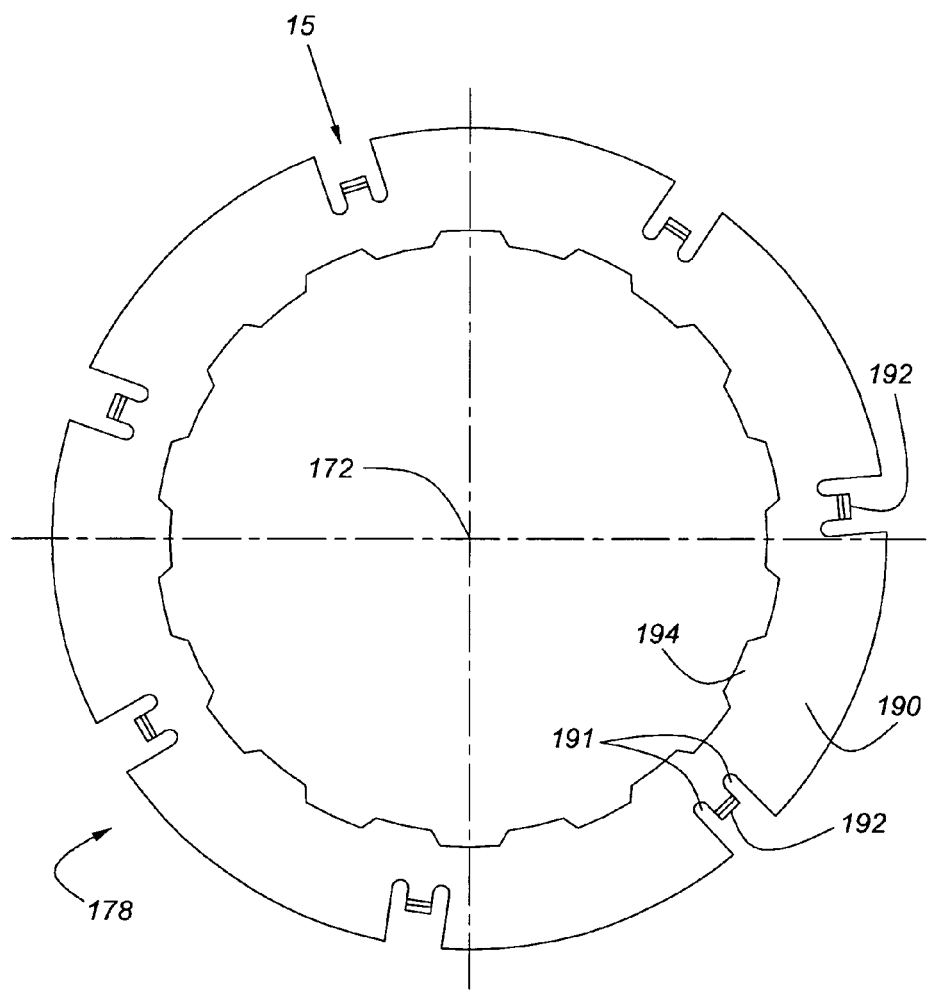
FIG. 13 is a front view of a retainer plate.
Figure 15:
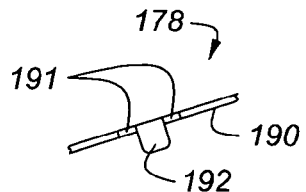
FIG. 15 is a local view of the retainer plate taken in the direction of arrow 15.
Figure 14:
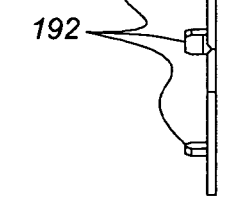
FIG. 14 is a is a side view of the retainer plate of FIG. 13.

Turning now to FIGS. 13-15, the retainer plate 178 is a substantially planar circular ring 190, whose axial inner surface is located adjacent the open axial end 177 of the pockets 170. Angularly spaced tabs 192 extend axially from the surface of ring 190 toward the rocker plate 168, to which the retainer plate 178 is secured for rotation with the rocker plate. An inner periphery 194 of the retainer plate is formed with a contour similar to a spline having alternating crests and valleys angularly spaced about axis 172. FIG. 15 shows a typical axially directed tab 192 that extends from the plane of surface 190 of the retainer plate 178 and the adjacent relief recesses 191, which facilitate bending the tabs into position.

In an alternative form, the retainer plate 178 may be a disc that is welded, preferably by capacitive discharge welding, to the rocker plate 168. In this case, the angularly spaced tabs 192 that extend axially from the surface of ring 190 toward the rocker plate 168 are eliminated and the tab recess 220, shown in FIG. 17, are eliminated from the rocker plate.

Figure 16:
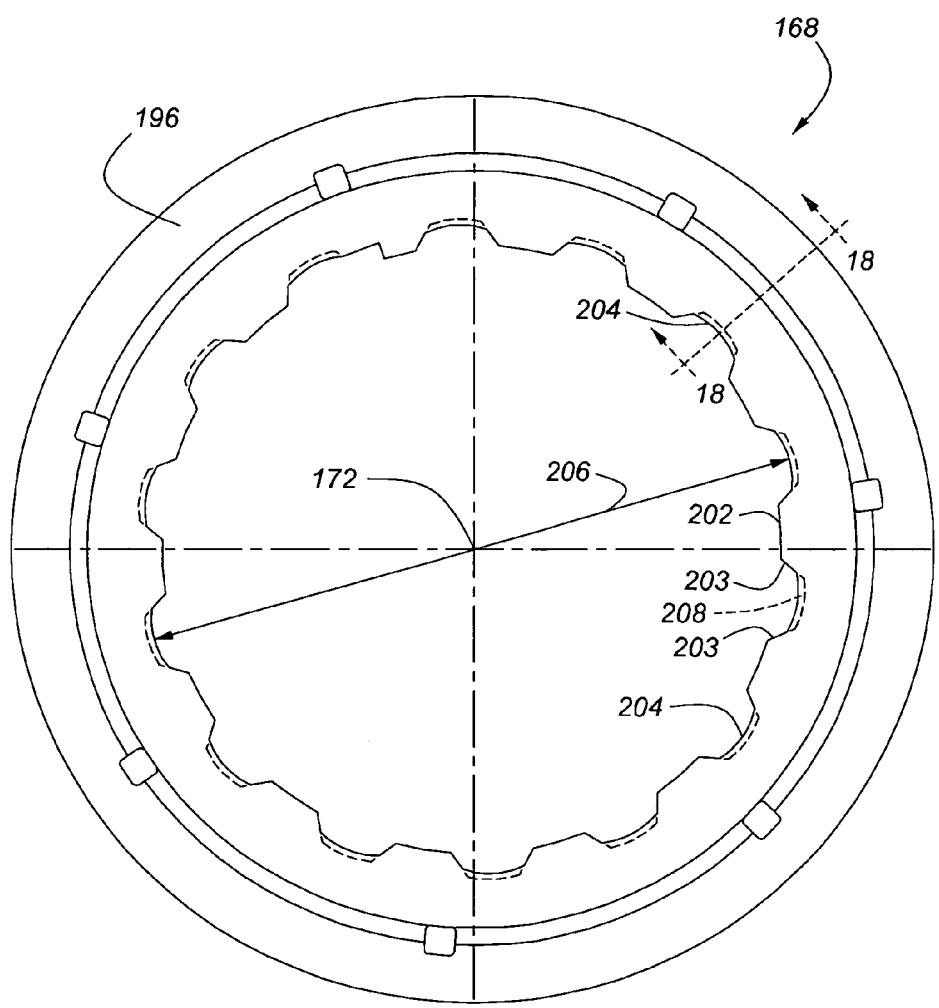
FIG. 16 is a end view of a the rocker plate of FIG. 12 looking toward the axial end that is opposite the open axial end of the pockets.

Referring to FIG. 16, the face 196 of the rocker plate 168 that is axially opposite the open axial end 177 of the pockets 170 is formed at its radial inner surface with an interior spline, which extends axially across the rocker plate. The spline contour includes alternating crests 202 and valleys 204 angularly spaced about axis 172 and connected by tooth faces 203. The interior spline, which has a major diameter 206, is driveably engaged by an external spline on a component connected by the splines. The spline valleys 204 each have an arcuate base that creates a space for a fluid passage 208 between the major diameter 206 and the base of the valley 204.

Figure 18:
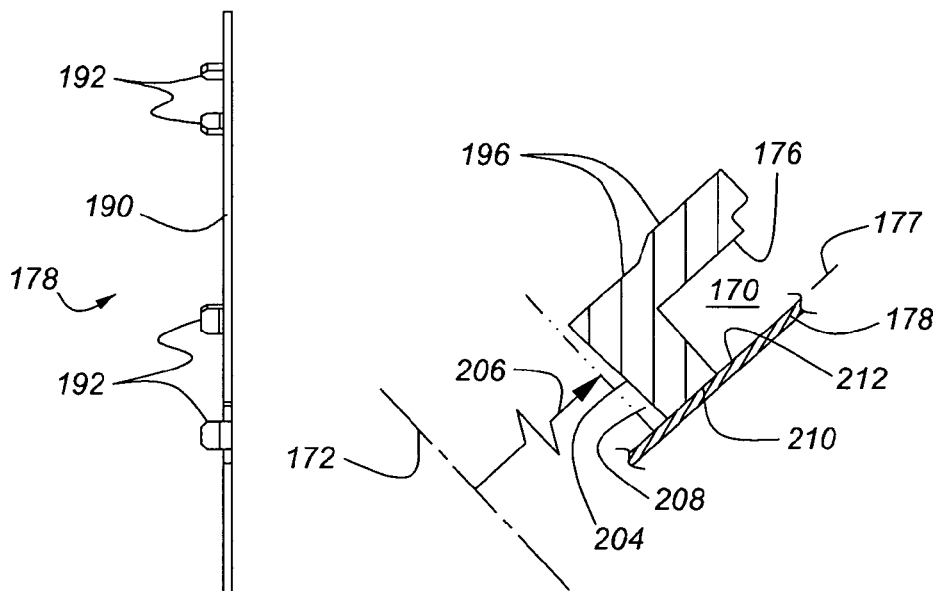
FIG. 18 is a cross section taken at plane 18-18 of FIG. 17.

FIG. 18 shows that the passages 208 are directed axially across the rocker plate from surface 196 toward the open axial end 177 of each pocket 170 and radially outward from axis 172. Fluid lubricant, carried in the fluid passages to the retainer plate 178, flows between the rocker plate surface 210 and the axially inner surface 212 of the retainer plate 178 into the pocket 170 and radially outward against the notches 162 of the cam plate 160. In this way, the rocker, pocket and notches are continually lubricated.

Figure 19:
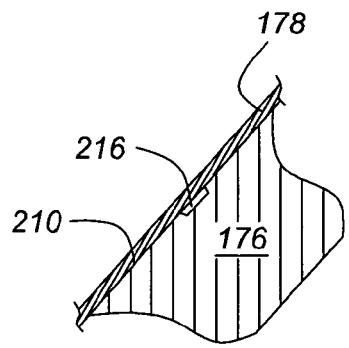
FIG. 19 is a cross section taken at plane 19-19 of FIG. 17.
Figure 17:
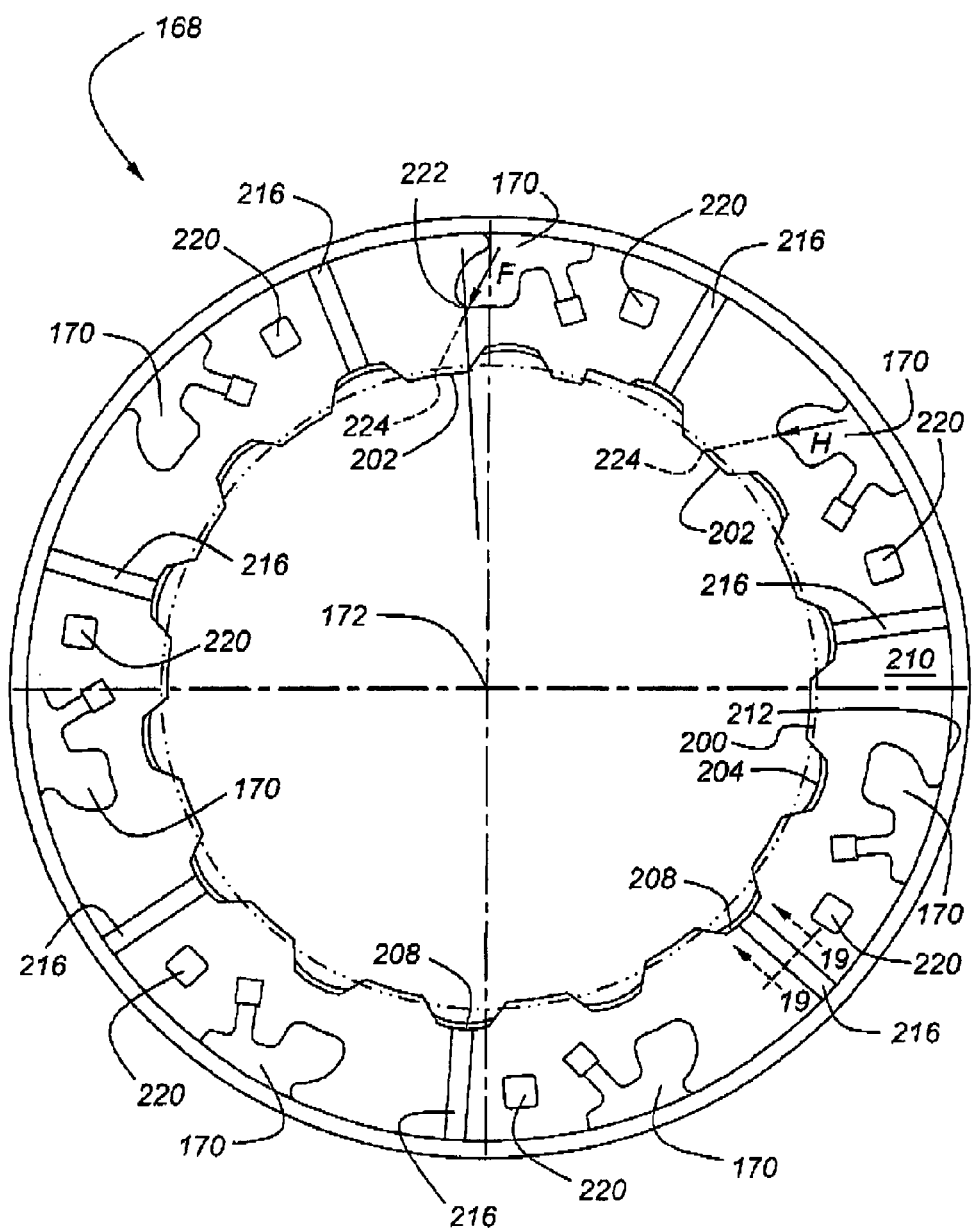
FIG. 17 is a end view of a the rocker plate of FIG. 12 looking toward the open axial end of the pockets.

Referring now to FIGS. 17 and 19, the surface 210 of rocker plate 168 that which is axially opposite surface 196 is formed with angularly spaced radial channels 216, each channel being located between successive, adjacent pockets 170. Each channel 216 extends from the spline valleys 204, radially across surface 210 and is covered by the retainer plate 178. Fluid lubricant exiting channels 216 is thrown radially outward against the surfaces of the notches 162 on the cam plate 160

The axial surface 210 is also formed with angularly spaced tab recesses 220, which are located and sized to receive the tabs 192 of the retainer plate 178. When the tabs 192 are engaged with the recesses 220, retainer plate 178 is located adjacent the axial surface 210 of the rocker plate 168, and the retainer plate is secured to the rocker plate so that they rotate as a unit.

When the clutch becomes engaged, at least one rocker in a pocket 170 of the rocker plate 168 becomes engaged with a notch 162 on the cam plate 160, and a force F is applied to the rocker, as shown in FIG. 1. The external force applied to the engaged rocker is transmitted to a corner 222 of the respective pocket 170, where the applied force F is reacted on rocker plate 168.

According to another aspect of this invention, the internal splines at the inner radial periphery of rocker plate 168 are angularly positioned about axis 172 and indexed relative to the corner 222 of each pocket 170 such that a spline crest 202 is located at an extension of the line of action of the force represented by vector F. The line of action of force F extends from the mid-point on surface 86 of a rocker 26 that is engaged with a cam 36 to the opposite corner of the pocket where the engagement force applied by the cam is reacted an the pocket wall. As FIG 17 shows, the preferred location of the spline crest 202 is such that the line of action of force F passes through the crest at point 224, substantial midway between the angular extremities of the crest.

To ensure that the spline crest is so positioned and indexed to provide the desired structural advantage produced by its correct location, the spline crest 202 is located radially inward and angularly offset from the nearest pocket 170 and its corner 222, and the spline valley 204 that is nearest each pocket is radially inward of and angularly aligned with the pocket.

Figure 20:
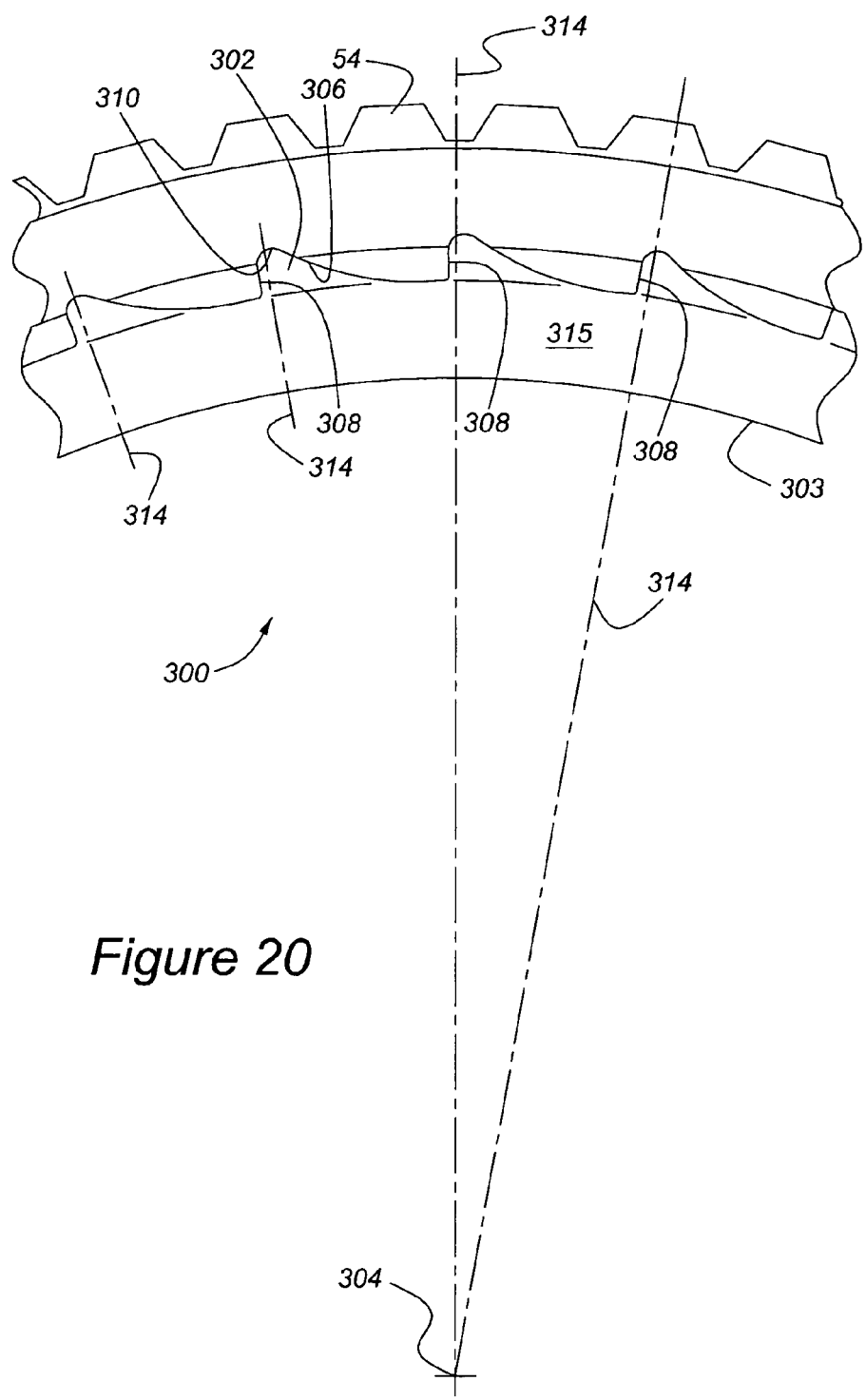
FIG. 20 is a side view of an alternate embodiment of cam plate.
Figure 21:
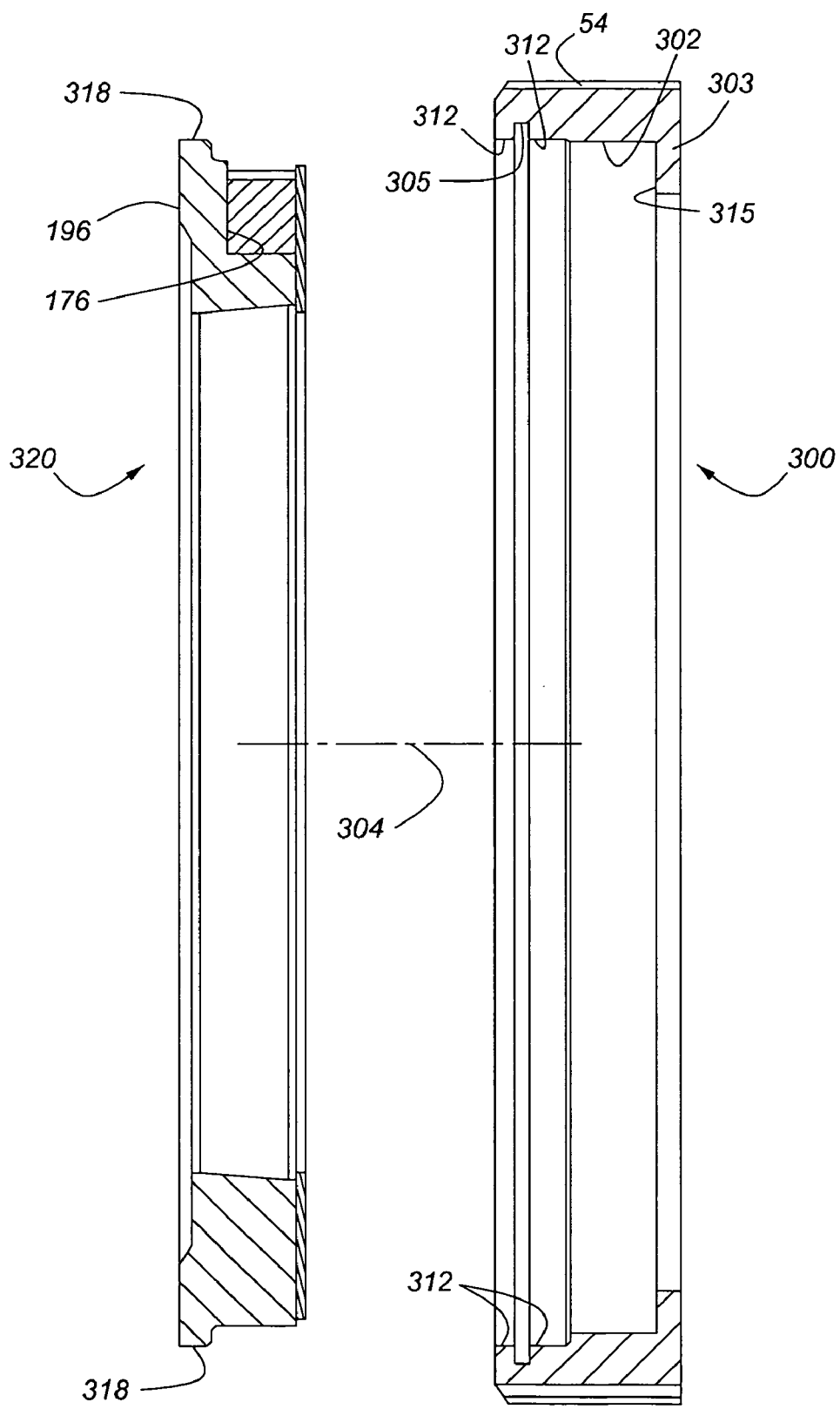
FIG. 21 is a cross section taken through a diametric plane of a cam plate and rocker plate positioned for piloted assembly on journal surfaces.

Referring now to FIGS. 20 and 21, a one-way clutch assembly similar to that of FIG. 12 includes a circular cam plate 300 formed with cams 302, spaced angularly about central longitudinal axis 304; a radial flange 303, located at an axial end of the cam plate; and a recess 305, located at the opposite axial end of the cam plate. Each cam 302 includes a contact face 308, a convex cam surface 306 directly radially outward and angularly about axis 304, and an undercut 310 or fillet radius, which forms a transition between contact face 308 and cam surface 306. Undercut 310 provides relief against a stress concentration that would otherwise be present if the stop surface 308 intersected cam surface 306 at and acute angle. There are approximately 37 cams formed on the inner periphery of the cam plate 300. Surfaces 306, 308 and 310 extend to the inner surface 315 of the radial flange 303 and axially parallel to central axis 304.

A journal surface 312, for supporting a rocker plate formed with a mating journal surface 182, is interrupted by recess 305, which contains a snap ring 184 fitted resiliently in the recess 305, as is shown in FIG. 12. The cam plate 300 is formed with an internal, axially directed cylindrical journal surface 312, and the rocker plate 320 is formed with an external, axially directed cylindrical journal surface 182. The cam plate and rocker plate are piloted on the journal surfaces 312, 182 for axial movement to the assembled position. Upon installation, surfaces 312, 182 are mutually engaged and provide bearing support for relative rotation of the cam plate and rocker plate. A retainer ring 184 seats in the recess 305 to secure the rocker plate 320 against axial movement relative to the cam plate 160 after their assembly and during operation.

As described with reference to the clutch illustrated in FIGS. 12-19, lubricant flows radially outward on the inner face 315 of flange 303 after exiting the fluid channels 204, 208. The lubricant flows against the concave cam surface 306, contacts surface 308, and tends to accumulate in each undercut 310.

The contact surface 308 of each cam 302 is substantially parallel to and spaced from a respective plane 314, which extends radially outward from central axis 304 and is located angularly about axis 314 at each cam location. The cam surface 306 is formed from several circular arcs, which transition gradually, radially outward toward undercut 310 and angularly about axis 304.

FIG. 17 shows a rocker plate 168 formed with seven pockets 170, which are angularly spaced about a central axis 172. FIG. 22 illustrates a portion of an alternate rocker plate 320 fitted within the inner radial periphery of cam plate 300. Rocker plate 320 also includes seven pockets 322, angularly spaced at equal intervals about central axis 304. The base of each pocket 320 is formed with a concave cylindrical surface 324, a second concave cylindrical surface 326, and a planer surface 328 tangential to surfaces 324, 326. The radially outer end of spring recess 327 transitions to a planer surface 330 using a fillet radius 322. A transition from planer surface 330 and cylindrical surface 324 is made using a rocker retention projection 332, whose center is located externally from the pocket 322. The center of cylindrical surface 324 is located on a pivot axis 334, which passes axially through the thickness of rocker plate 320 and is substantially parallel to central axis 304.

Figure 25:
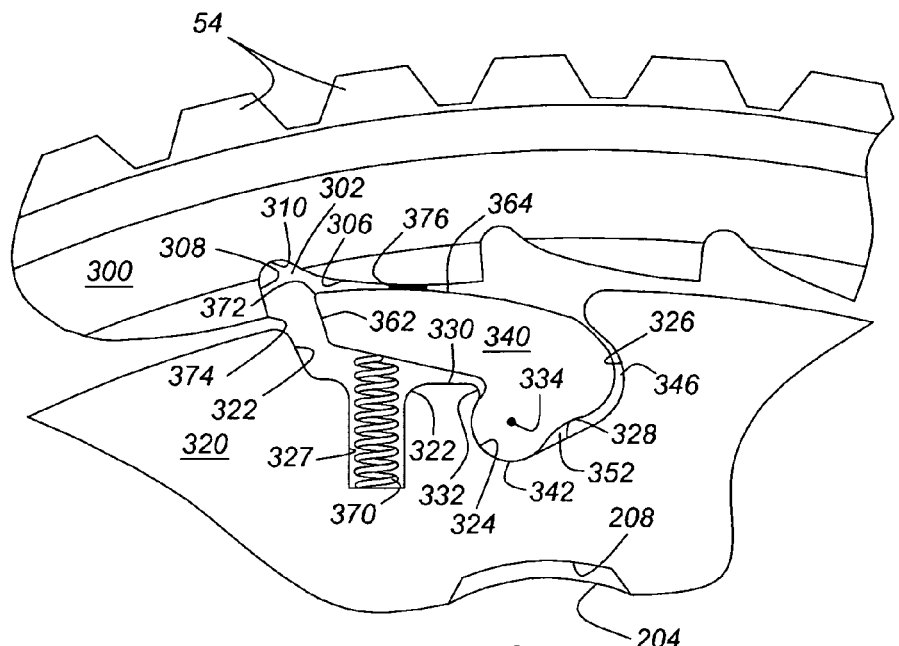
FIG. 25 is a partial end view of the one-way clutch showing the rocker plate installed in the cam plate, a rocker located in a pocket, and the rocker disengaged from and ratcheting on the cams as they rotate counterclockwise relative to the rocker plate.

Each pocket 322 is blind, i.e., closed at one axial end by surface 176 and is open at the opposite axial end 177. Each pocket 322 has an aperture or opening 323 at its radial outer periphery, through which opening a portion of the respective rocker 340 passes as it pivots to engage and disengage the cams 310, which face the pockets 322. However, the rocker 340 cannot be removed from its pocket through the aperture 323 because the installed rocker is retained or trapped there by the undercut or fillet 332. FIG. 25 shows the rocker 340 retained in the pocket 322 due to contact between rocker retention projection 332 and the undercut 354, and the rocker contacting surfaces 324 and 326. Therefore, each rocker 340 is inserted or installed in the respective pocket 322 and is removed from the pocket using access provided at the open end 177 at axial end surface 210.

A rocker 340 of the type that is installed in each pocket 322 is illustrated in FIGS. 23 and 24. The rocker includes a convex cylindrical surface 342, which is complementary to pocket surface 324, a second convex cylindrical surface 346, which is complementary to pocket surface 326, and a concave or recessed surface 352 that blends tangentially with surfaces 342, 346. Pocket surface 324 has a center at 344, which upon installation of the rocker 340 in the pocket 322 is substantially parallel to, or coincident with the pivot axis 334. Recess 352 prevents the rocker from contacting planer surface 328 of the pocket 322.

The rocker is formed with a fillet radius 354, whose center is at 356. The fillet radius 354 and its adjacent surfaces 358, 360 form an undercut 354 that retains the rocker 340 in the pocket 322 and prevents it from exiting radially from the pocket 322 through the aperture 323. The rocker extends from the undercut 356 to an engagement face 362, which engages contact face 308 of the cam 302 when the clutch is engaged. The radial outer surface 364 of the rocker 340 is formed with various circular arcs, one arc having a center at 366, other arcs completing a smooth transition to rocker surface 346.

Figure 26:
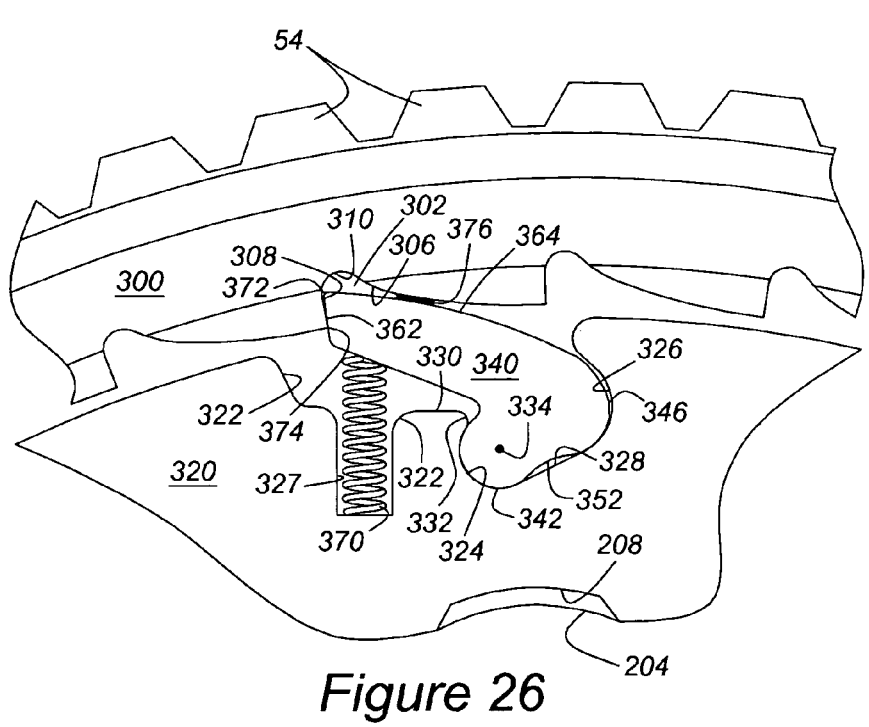
FIG. 26 is a partial end view of the one-way clutch similar to FIG. 25, showing a rocker about to engaging the contact face of a cam.

The contour of surface 364 is formed such that a space located between a portion of its length and a portion of the contour of cam surface 306, when the clutch is overrunning and the rocker is ratcheting on the cam plate, contains hydraulic fluid, preferably lubricant or automatic transmission fluid that has been supplied to the cam surface 306, as described with reference to FIGS. 16-19. FIGS. 25 and 26 show hydraulic fluid 376 in the space between the contours of the cam surface 302 and the rocker surface 364.

FIG. 24 shows the approximate location of the rocker's center of mass 350, located mid-way between the end faces and closer to surfaces 342, 346 than to the engagement surface 362.

FIG. 25 shows the rocker 340 disengaged from the cam ring 300 and ratcheting on the cams 302 as they rotate counterclockwise relative to the rocker plate 320. The rocker surface 342 is engaged with pocket surface 324 causing the rocker 340 to engage the pocket 322 in a socket joint. A spring 370, located in spring recess 327, urges the rocker 340 to pivot about pivot axis 334 causing rocker surface 364 to pivot about pivot axis 334 toward engagement and into contact with surface 306 of each cam as it passes the rocker 340. The rocker is restrained from exiting the pocket 322 due to engagement of its undercut 354 with the pocket's undercut 322. A bead of hydraulic lubricant 376 present on cam surface 306 is located between cam surface 306 and the radial outer surface 364 of the rocker 340, thereby dampening or cushioning contact between the rocker and cam as the clutch overruns.

The rockers 340 continue to ratchet on the cams 302 while the cam ring 300 rotates counterclockwise relative to the rocker ring 320. As FIG. 26 illustrates, when the corner 372 of each rocker clears the corner 374 of the cam's contact surface 308, the rocker springs radially outward into contact with the cam surface 306. FIG. 26 shows the rocker 340 having cleared corner 374 of the contact surface 308 but before engagement surface 362 and contact face 308 become engaged. Hydraulic lubricant 376 present on cam surface 306 becomes located between cam surface 306 and the radial outer surface 364 of the rocker 340, thereby dampening or cushioning contact between the rocker and the cam. As the rocker ratchets on the cams 302, lubricant 376 located on cam surface 306 and undercut surface 310 is compressed by the ratcheting motion of the rocker 340 and is pumped axially away from radial flange 303 of the cam plate 300 and the cam surfaces 306, 308 310 to the journal surface 312. In the example described here, this pumping action, which occurs when each of thirty-seven cams 302 ratchet over seven rockers 340 per revolution of the cam plate 300 relative to the rocker plate 320, provides continuous lubricant flow to the journal surface 312 of the cam plate and the mating journal surface of the rocker plate.

Figure 27:
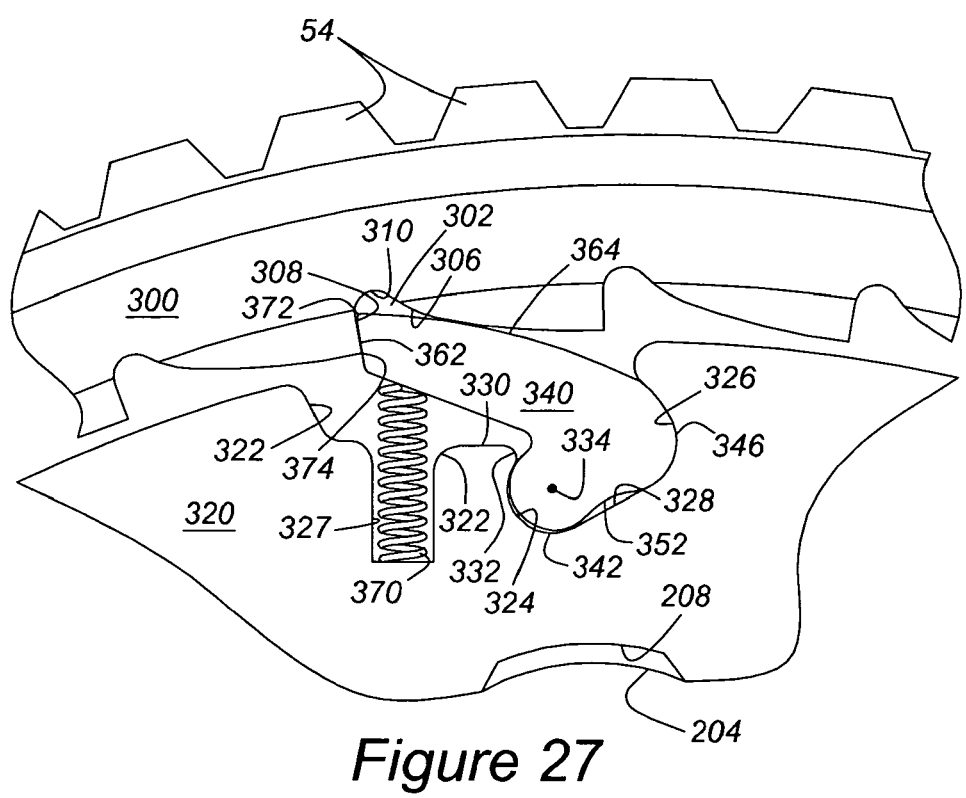
FIG. 27 is a partial end view of the one-way clutch similar to FIG. 25, showing a rocker engaged with the contact face of a cam.

The clutch overruns while cam plate 300 rotates faster than, and in the same direction as the rocker plate 320. When the speed of the rocker plate 320 equals or exceeds that of cam plate 300 or the cam plate rotates in the opposite direction from the rocker plate, the clutch engages. Engagement occurs when the corner 372 of a rocker 340 clears the corner 374 of the cam's contact surface 308, thereby allowing the rocker's engagement surface 362 to engage the cam's contact surface 308. As this engagement occurs, the rocker 340 pivots clockwise about pivot axis 334 from the position of FIGS. 25 and 26, and rocker surface 346 is forced against pocket surface 326, as shown in FIG. 27. When the clutch is engaged, force F, which is transmitted between the rocker plate 320 and cam plate 300 as described with reference to FIG. 17, forces rocker surface 346 against pocket surface 32 and opens a clearance space between pocket surface 324 and the adjacent rocker surface 342.

Figure 28:
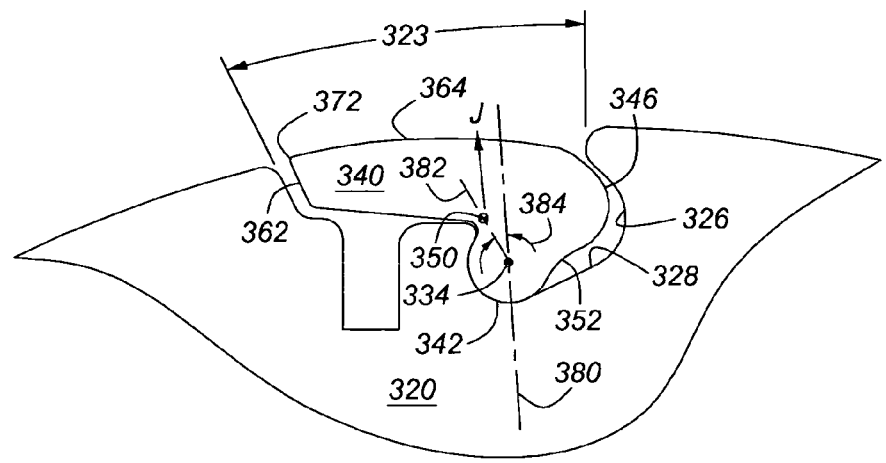
FIG. 28 illustrates the rocker's center of mass located to assist engagement with the cams.

In FIG. 28, the direction of a radial line 380, drawn from the central axis 304 through the pivot axis 334, represents the radial direction of centrifugal force acting on the components of the clutch. Line 382 is a straight line containing points representing the pivot axis 334 and center of mass 350 of the rocker 340. When the rocker plate 320 rotates about axis 304, the centrifugal force of the rocker, represented by vector J, is directed radially from axis 304 through the rocker's center of mass 350. The rocker is shown in FIG. 28 fully retracted within the pocket, i.e., rotated in the pocket counterclockwise about pivot axis 334 until contact between the rocker and the rocker plate prevents further rotation. With the rocker in that position, its center of mass 350 is located relative to the pivot axis 334 such that centrifugal force J applied to the rocker 340 causes the rocker to pivot clockwise about pivot axis 334, thereby assisting the force of spring 370 in pivoting the rocker toward engagement with the cams 302. However, with the clutch operating in its normal range of rotational speed, the magnitude of force J far exceeds the magnitude of the force produced by spring 370.

Centrifugal force J pivots each rocker 340 about axis 334 such that the rocker's outer surface 364 extends through the aperture 323 on the surface of the cam plate 300 to the position shown in FIG. 25, where transmission fluid 376, or another hydraulic fluid, attenuates or cushions repetitive contact between the cam surfaces 306 and the rocker's outer surface 364 as the clutch overruns.

Because the spring force is small relative to the magnitude of the rocker's centrifugal force, the magnitude, direction and location of force J are the primary variables that establish a preferred angular range of the rocker about pivot axis 334 as the clutch overruns. FIG. 25 shows the rocker 340 in that preferred range. . . . It has been determined that when the rocker 340 is fully retracted within the pocket a preferred range of the acute angle 384 formed by the intersection of radial line 380 and line 382 is in the range between zero degrees and 20 degrees.

Figure 29:
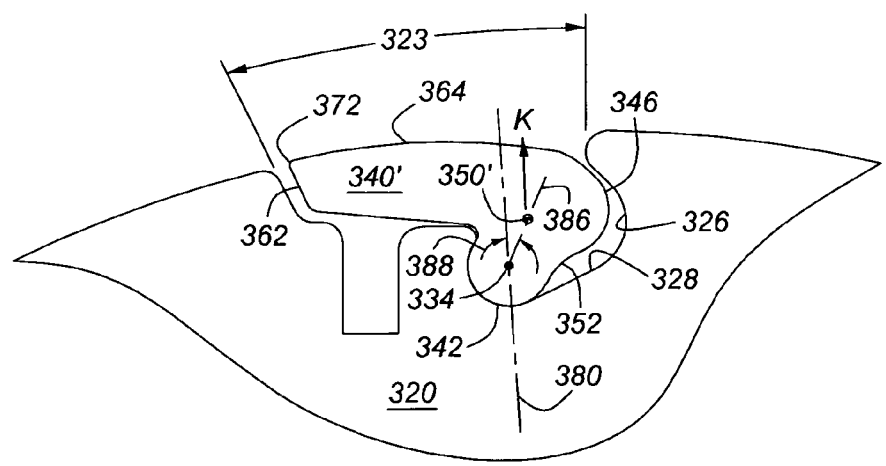
FIG. 29 illustrates the rocker's center of mass located to oppose engagement with the cams.

The rocker 340' is shown in FIG. 29 fully retracted within the pocket, i.e., rotated in the pocket counterclockwise about pivot axis 334 until contact between the rocker and the rocker plate prevents further rotation. The rocker's center of mass 350' is located relative to the pivot axis 334 such that the rocker's centrifugal force K, which is directed radially from the mass center 350', causes the rocker 340' to pivot counterclockwise about pivot axis 334 away from the cams 302 in opposition to the force of spring 370. However, the force of spring 370, which opposes counterclockwise pivoting of the rocker, at low rotational speed, is high relative to the centrifugal force on the rocker. Radial line 380 extends from central axis 304 through the pivot axis 334, and a line 386 extends from the pivot axis to the rocker's center of mass 350'. In the case when centrifugal force operates to disengage the clutch and the rocker 340 is fully retracted within the pocket, a preferred range of the acute angle 388 formed by the intersection of radial line 380 and line 386 is in the range between zero degrees and 20 degrees.

Figure 30:
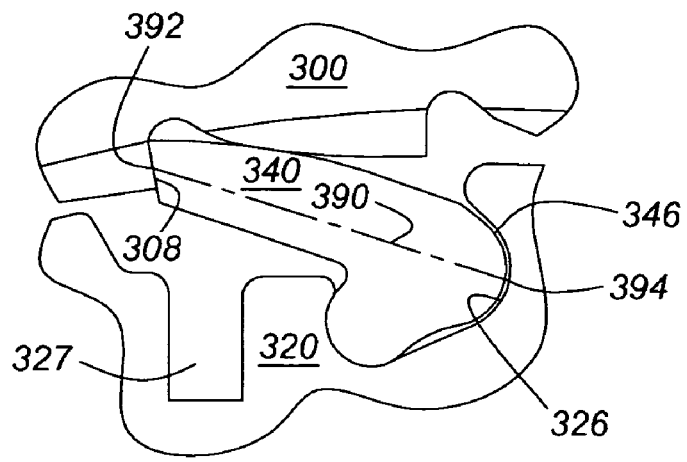
FIG. 30 is a schematic diagram illustrating the line of action of a force transmitted between a cam and a rocker pocket when the clutch is engaged.
Figure 31:
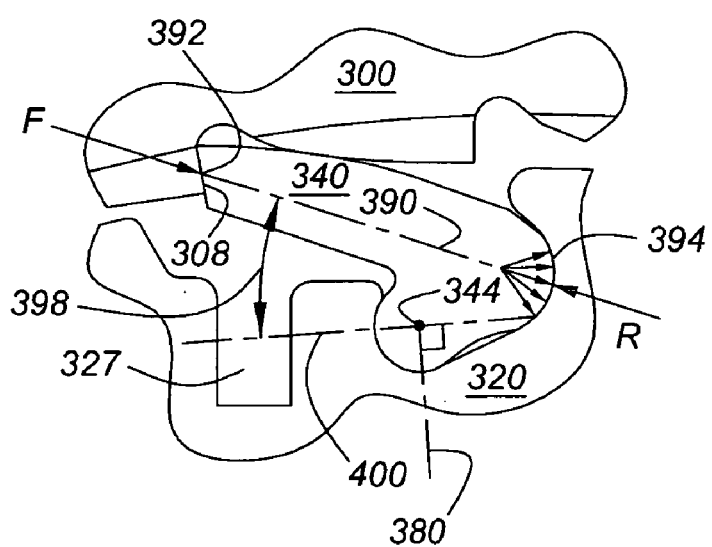
FIG. 31 is a schematic diagram illustrating the angle of attack between the line of action of FIG. 30 and a line perpendicular to a radial line through the pivot axis.

When a cam 310 is engaged by a rocker 340, the force F applied to the rocker by the cam that is engaged by the rocker and its reaction R on the pocket where the rocker is located can be represented by a straight line 390. Line 390 connects the mid-point 392 of the area of contact between the rocker and the contact face 308 of the engaged cam, and the mid-point 394 of the area of the second concave cylindrical surface 326 contacted by the convex rocker surface 346. FIGS. 30 and 31 show these points, lines and surfaces.

The tangential component of force F, which is perpendicular to radial line 380, induces a torsion moment in the rocker plate about axis 304 tending to rotate the rocker plate 320 with the cam plate 300 as a unit about axis 304. The loading applied to the pocket at the reaction R is distributed angularly about the center of cylindrical surface 326 and axially across the depth of the pocket. The distributed loading has a peak magnitude at line 390 and a decreasing magnitude as distance from line 390 increases. The peak magnitude of the distributed loading is along line 390 and has no radial component about the center of pocket surface 326. However, the radial components of the distributed loading induce tensile stress in the cam plate.

To avoid a tension failure of the cam plate due to this loading, an axial end 176 of each pocket is closed by a bulkhead face 196 located axially opposite the open axial end 177, thereby providing radial tension continuity across the pocket opening. The stiffness of the bulkhead further causes the distributed loading on the pocket caused by Force F to be concentrated at the axial end of the pocket that is closest to the bulkhead.

Referring now to FIG. 31, when a cam 310 is engaged by a rocker 340, an angle 398 is formed between the line of action 390 and a line 400 that is perpendicular to the radial line 380 that extends from the rocker axis 304 to the pivot axis 334. When angle 398 is large, the radial component of force F, parallel to line 380, is relatively large, and the tangential component, parallel to line 400, is small. Therefore, when angle 398 is large, force F has less of a tendency to rotate rocker plate 320 about the central axis 304 and more of tendency to force the rocker plate radially toward axis 304. But when angle 398 is smaller, the radial component of force F parallel to line 380 and tending to rotate the rocker plate about axis 304, is relatively large, and its tangential component is small. It has been determined that a preferred range of the angle 398 is between zero degrees and 45 degrees. In that range, the magnitude of material stress, induced in the rocker plate by radial directed load, are lower than the strength capacity of the rocker plate material.

Figure 32:
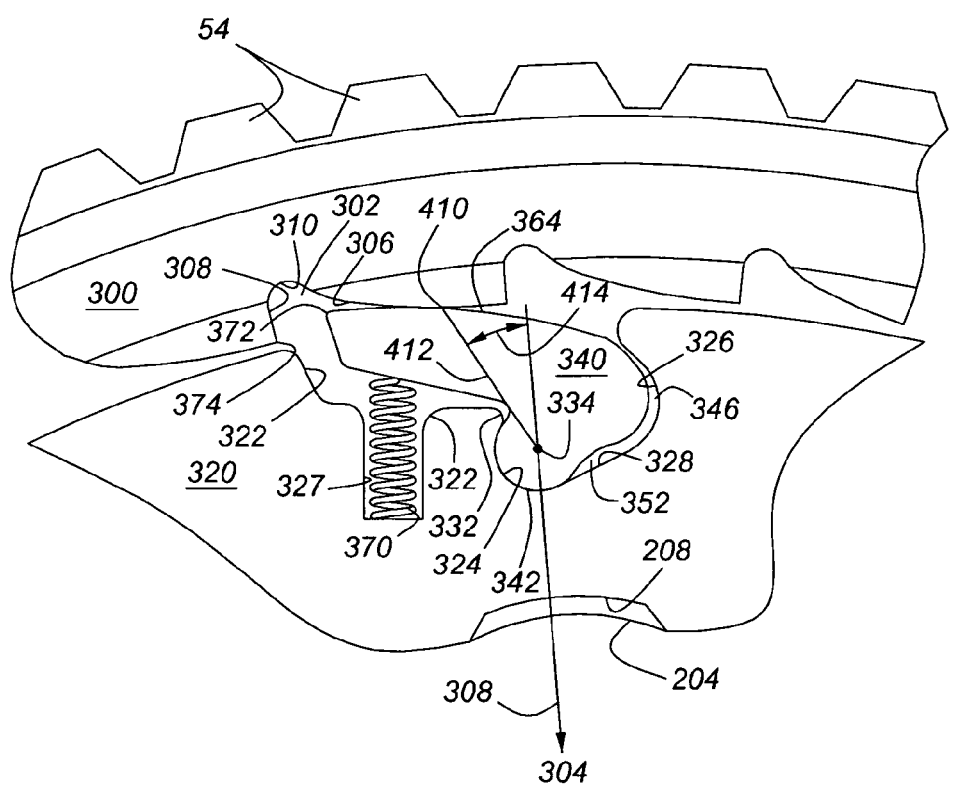
FIG. 32 is a partial end view of the one-way clutch showing the rocker plate installed in the cam plate and a the rocker disengaged from and ratcheting on the cams as they rotate counterclockwise relative to the rocker plate.

Referring to FIG. 32 in which a rocker plate 320 is shown installed in a cam plate 300, the rocker 340 located in pocket 322 is ratcheting on the cams 310 as the cam plate rotates counterclockwise relative to the rocker plate. The cam plate and rocker plate are located such that the rocker's outer surface 364 is in contact with cam surface 306 at the line 410, whose trace appears in the FIG. 32 as a point, on which surfaces 364 and 306 first make contact as the cams move counterclockwise across the rocker. Line 308 is a straight radial line extending from the central axis 304 through the pivot center 334. Line 412 is a straight line connecting pivot center 334 and the center of the line contact 410 on the rocker surface 364. Angle 414 is formed by the intersection of lines 308 and 412.

In order to minimize the magnitude of the radial component of the force produced by contact between rocker 364 and cam surface 306, preferably first contact 410 between the rocker and cam occurs on the trailing side of radial line 308, i.e., after the cam rotates past line 308. Preferably, the angular offset of the first contact from line 308 is sufficient to minimize the magnitude of the radial component of the contact force. It has been determined that angle 414 is preferably greater than ten degrees and should be in the range 10-45 degrees.

Figure 33:
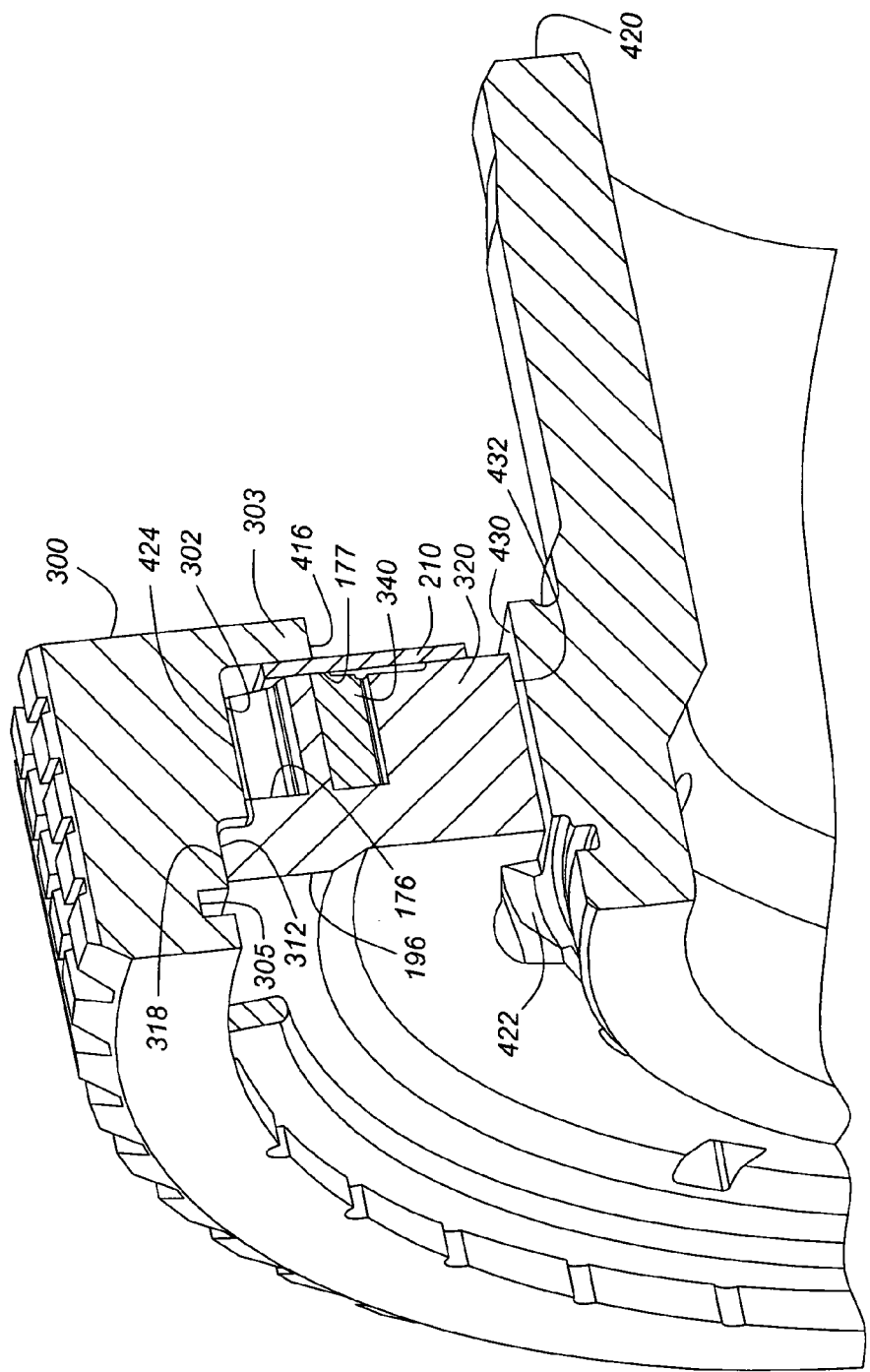
FIG. 33 is a perspective view of a one-way clutch installed in an assembly showing journal surfaces and body surfaces on the inner ring and outer ring.

FIGS. 21 and 33 illustrate a technique for piloting the cam plate 300 and rocker plate 320 to their assembled positions. In FIG. 21, the cam plate 300 is formed with an internal, axially directed cylindrical pilot or journal surface 312. Rocker plate 320 is formed with an external, axially directed cylindrical pilot or journal surface 318, on which the cam plate's surface 312 is piloted for axial movement to the assembled position. Upon installation, surfaces 312, 318 are mutually engaged and provide bearing support for relative rotation of the cam plate 300 and rocker plate 320. A retainer ring seats in the recess 305 to secure the rocker plate 320 against axial movement relative to the cam plate 300 after their assembly and during operation.

FIG. 33 shows the rocker one-way clutch having it cam plate 300 encircling the rocker plate 320. The hub 420, located in the transmission on a nonrotating support, is the primary reference locator of the assembly. Although there is clearance between the hub 420 and inner plate 320 to allow their assembly, they could be a pressed together or formed of a single piece. The support (not shown) is connected to a transmission case and does not rotate. The hub 420 is connected to other transmission components, which apply energy to the hub causing it to rotate.

The inner race 320, which is illustrated in FIG. 33 as a rocker plate but could be a cam plate, is formed with a stepped cross section, whose larger diameter is machined to create the diameter of journal surface 318. The hub 420 locates the radial position of rocker plate 320. The splines 422 between the hub 420 and rocker plate 320 force those two components to maintain zero relative speed and to transfer torque between them. Components attached to the hub locate the rocker plate 320 axially.

In one example, the minimum and maximum dimensions of the diameter of the rocker plate journal surface 318 are 5.0205 and 5.0235, respectively. The minimum and maximum dimensions of the diameter of the rocker plate body surface 424 are 4.8450 and 4.8550, respectively.

The minimum and maximum dimensions of the diameter of the cam plate journal surface 312 are 5.0265 and 5.0305, respectively. The minimum and maximum dimensions of the diameter of the cam plate body surface 302 are 4.8725 and 4.8775, respectively.

From these dimensions it can be seen that the maximum clearance between the cam plate and rocker plate race occurs between the body surface diameters 424, 302, where the maximum and minimum clearance is 0.0325 and 0.0175, respectively. The minimum clearance between the two plates occurs at the journal surfaces 312, 318, where the maximum and minimum clearance is 0.0100 and 0.0030, respectively.

A reason that the clearance between journal surfaces 312, 318 is less than the clearance between the body surfaces 424, 302 is to ensure that the cam plate body surface diameter 424 does not contact the rocker plate body diameter 302. The adjacent body surfaces are cylindrical, intermittent surfaces, interrupted by the pocket apertures 323, which could cause instantaneous lockup of the two plates during high speed overrun, were it not for the dimensional clearance precautions being discussed here. The journal surface diameters also maintain the relative position of the cam or outer plate 300 relative to the rocker or inner plate 320 during lockup. It is possible that only one rocker 340 may engage a cam during lockup. When this occurs, the outer plate 300 tends to rotate about the engaged rocker at the area of contact engagement. The small clearance at the journal interface 312-318 allows the outer plate 300 to rotate only a small distance before mutual contact of the journal surfaces 312, 318 occurs. The tight clearance at the journal surfaces restricts radial play of the outer plate 300 with respect to clearance to of the inner plate 320 during all modes of operation—overrun, transition, and lockup.

Journal surfaces 312 and journal surface 318 are cylindrical surfaces. Journal surface 318 is piloted on surface 312, thereby reducing the potential for the two surfaces to weld together. The sharp edges of the undercuts 310 on the outer plate 300 tend to disrupt the oil film that forms at the interface. If both surfaces were intermittent the inner plate 320 and outer plate 300 would contact at these high stress points and could weld or stick. The continuous journal surface distributes the loading, which reduces the potential for welding.

Alternatively, piloting the inner and outer plates 300, 320 can be performed using a third component, such as hub 420. In this case, a relatively tight dimensional tolerance is established between the diameter of surface 416 of the outer plate 300 and the diameter of surface 430 of the hub 300, which becomes located close to surface 416 by extending flange 303 radially toward hub surface 430. The magnitude of the clearance between the diameters of the flange surface 416 and hub surface 430 is similar to the maximum and minimum clearance described above between the inner and outer plates at journal surfaces 312, 318.

A second relatively tight dimensional tolerance is established between the diameter of surface 432 of the inner plate 320 and the diameter of surface 430 of the hub 300, similarly to the maximum and minimum clearance described above between the inner and outer plates at surfaces 312, 318. These two clearances, at the 430-432 interface and 416-430 interface, produce a predetermined clearance at the journal interface 312-318.

The journal surface interface 312-318 is axially spaced from the cams 302 and rockers 340. This allows the number of cams to be maximized, thereby reducing backlash, which can produce an objectionable noise, such as a clunking sound. Other overrunning clutches in the prior art attempt to use the body diameters for piloting the inner and outer plates. These clutches require a significant portion of the outer plate body surface area to be smooth and uninterrupted for piloting, thus reducing the size of the remaining area, permitting fewer cams to occupy the residual area, and increasing the risk of backlash.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An overrunning clutch comprising;
   a cam plate including arcuate first ratchet surfaces spaced about an axis;
   a rocker plate including pockets spaced about the axis, each pocket having a pivot center;
   rockers, each rocker located in a pocket, including an arcuate second ratchet surface and a point where the second ratchet surface first contacts a first ratchet surface, said point located such that a line through the axis and the pivot center and a second line through the pivot center and said point forms an angle greater than ten degrees;
   springs, each spring urging a rocker toward the cam plate.

2. The clutch of claim 1 wherein the rocker plate further comprising an aperture facing the cam plate, each rocker is formed with an undercut, each pocket is formed with a retention projection fitted into the undercut, contact of the rocker with the pocket and contact of the retention projection with the undercut preventing the rocker from being removed from the pocket by passing the rocker through the aperture.

3. The clutch of claim 1 wherein the rocker plate further comprises an aperture facing the cam plate and each rocker is prevented by contact with a pocket in which the rocker is located from being removed from the pocket by passing through the aperture.

4. The clutch of claim 1 wherein the rocker plate further comprises an opening facing the cam plate and each pocket opening permits a rocker to be installed in the pocket and to be removed from the pocket by passing through the opening.

5. The clutch of claim 1, wherein each pocket includes a surface that closes the pocket at an axial end, and an opening located at an axial end opposite the surface, the clutch further comprising a retainer plate secured to the rocker plate for rotation therewith and covering the open axial end of the pockets.

6. The clutch of claim 1, wherein the rocker plate further comprises;
   spring recesses mutually spaced angularly about the axis, each spring recess including an open axial end; and
   the clutch further comprises a retainer plate located adjacent an axial surface of the rocker plate, secured to the rocker plate, and covering the open axial end of the pockets and the open axial end of the spring recesses.

7. The clutch of claim 1, wherein the angle is in the range between ten degrees and forty-five degrees.

8. An overrunning clutch comprising;
   a rocker plate including pockets spaced about an axis, each pocket having a pivot center;
   a cam plate encircling the rocker plate, including arcuate first ratchet surfaces spaced about the axis;
   rockers, each rocker located in a pocket, including an arcuate second ratchet surface and a point where a first ratchet surface first contacts the second ratchet surface, said point located such that a line through the axis and the pivot center and a second line through the pivot center and said point form an angle greater than ten degrees;
   springs, each spring urging a rocker toward the cam plate.

9. The clutch of claim 8 wherein the rocker plate further comprises an aperture facing the cam plate, each rocker is formed with an undercut, each pocket is formed with a retention projection that is fitted into the undercut of the respective rocker, contact of the rocker with the pocket and contact of the retention projection with the undercut preventing the rocker from being removed from the pocket by passing the rocker through the aperture.

10. The clutch of claim 8 wherein the rocker plate further comprises an aperture facing the cam plate and each rocker is prevented by contact with a pocket in which the rocker is located from being removed from the pocket by passing through the aperture.

11. The clutch of claim 8 wherein the rocker plate further comprises an opening facing the cam plate and each pocket opening permits a rocker to be installed in the pocket and to be removed from the pocket by passing through the opening.

12. The clutch of claim 8, wherein each pocket includes a surface that closes the pocket at an axial end, and an opening located at an axial end opposite the surface, the clutch, further comprising a retainer plate secured to the rocker plate for rotation therewith and covering the open axial end of the pockets.

13. The clutch of claim 8, wherein the rocker plate further comprises;
spring recesses mutually spaced angularly about the axis, each spring recess including an open axial end; and
the clutch further comprises a retainer plate located adjacent an axial surface of the rocker plate, secured to the rocker plate, and covering the open axial end of the pockets and the open axial end of the spring recesses.

14. The clutch of claim 8, wherein the angle is in the range between ten degrees and forty-five degrees.

15. An overrunning one-way clutch comprising:
a cam plate including arcuate first ratchet surfaces spaced about an axis;
a rocker plate encircling the cam plate, including pockets spaced about the axis, each pocket having a pivot center;
rockers, each rocker located in a pocket, including an arcuate second ratchet surface and a point where the second ratchet surface first contacts a first ratchet surface, said point located such that a line through the axis and the pivot center and a second line through the pivot center and said point form an angle whose magnitude is greater than ten degrees;
springs, each spring urging a rocker toward the cam plate.

16. The clutch of claim 15 the rocker plate further comprising an aperture facing the cam plate, each rocker is formed with an undercut, each pocket is formed with a retention projection that is fitted into the undercut of the respective rocker, contact of the rocker with the pocket and contact of the retention projection with the undercut preventing the rocker from being removed from the pocket by passing the rocker through the aperture.

17. The clutch of claim 15 wherein the rocker plate further comprises an aperture facing the cam plate and each rocker is prevented by contact with a pocket in which the rocker is located from being removed from the pocket by passing through the aperture.

18. The clutch of claim 15 wherein the rocker plate further comprises an opening facing the cam plate and each pocket opening permits a rocker to be installed in the pocket and to be removed from the pocket by passing through the opening.

19. The clutch of claim 15 wherein each pocket includes a surface that closes the pocket at an axial end, and an opening located at an axial end opposite the surface, the clutch, further comprising a retainer plate secured to the rocker plate for rotation therewith and covering the open axial end of the pockets.

20. The clutch of claim 15, wherein the rocker plate further comprises;
spring recesses mutually spaced angularly about the axis, each spring recess including an open axial end; and
the clutch further comprises a retainer plate located adjacent an axial surface of the rocker plate, secured to the rocker plate, and covering the open axial end of the pockets and the open axial end of the spring recesses.

21. The clutch of claim 15, wherein the angle is in the range between ten degrees and forty-five degrees.

* * * * *